United States Patent
Toba

(10) Patent No.: US 9,077,783 B2
(45) Date of Patent: Jul. 7, 2015

(54) SOUND DATA TRANSMITTING APPARATUS, SOUND DATA TRANSMITTING METHOD, SOUND DATA RECEIVING APPARATUS, AND SOUND DATA RECEIVING APPARATUS

(75) Inventor: Kazuaki Toba, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 1040 days.

(21) Appl. No.: 12/657,446

(22) Filed: Jan. 21, 2010

(65) Prior Publication Data
US 2010/0191355 A1    Jul. 29, 2010

(30) Foreign Application Priority Data
Jan. 23, 2009  (JP) ................................ P2009-012749

(51) Int. Cl.
*G06F 17/00* (2006.01)
*H04H 20/88* (2008.01)
(Continued)

(52) U.S. Cl.
CPC ............. *H04L 65/602* (2013.01); *H04H 20/89* (2013.01); *H04R 3/12* (2013.01); *H04R 2420/07* (2013.01); *H04S 1/007* (2013.01); *H04S 3/008* (2013.01); *H04L 69/14* (2013.01)

(58) Field of Classification Search
CPC ...... H04R 3/12; H04R 5/02; H04R 2227/003; H04R 2227/005; H04H 20/89; H04H 2201/10–2201/12; H04H 2201/14; H04H 2201/15; H04H 2201/17–2201/19; H04H 2201/183; H04H 2201/186; H04H 2201/20; H04L 1/0041
USPC ........................................................ 700/94
See application file for complete search history.

(56) References Cited

U.S. PATENT DOCUMENTS 4,688,255 A * 8/1987 Kahn .............................. 381/16
6,144,705 A * 11/2000 Papadopoulos et al. ...... 375/296
(Continued)

FOREIGN PATENT DOCUMENTS

JP    06318922 A    11/1994
JP    08032534 A    2/1996
(Continued)

OTHER PUBLICATIONS

Hui-Ling Lou et al: "Multistream Transmission for Hybrid IBOC-AM With Embedded/ Multidescriptive Audio Coding" IEEE Transactions on Broadcasting, IEEE Service Center, Piscataway, NJ, US, vol. 48, No. 3, Sep. 1, 2002, pp. 179-192, XP011070271.
(Continued)

*Primary Examiner* — Davetta W Goins
*Assistant Examiner* — Daniel Sellers
(74) *Attorney, Agent, or Firm* — Hazuki International, LLC

(57) ABSTRACT

A sound data transmitting apparatus that transmits digital sound data using first and second transmission channels for transmitting transmission signals of first and second forms respectively guaranteed and not guaranteed to obtain, as reception data, data same as transmission data, includes: a data separating unit that separates transmission digital sound data into first and second sound data that should be transmitted through the first and second transmission channels, respectively; first and second transmission processing units that process the first and second sound data separated by the data separating unit to obtain the transmission signals of the first and second forms, respectively; and a data transmitting unit that transmits, through the first and second transmission channels, the transmission signals of the first and second forms obtained by the first and second transmission processing units, respectively.

1 Claim, 9 Drawing Sheets

(51) Int. Cl.
  *H04L 29/06* (2006.01)
  *H04H 20/89* (2008.01)
  *H04R 3/12* (2006.01)
  *H04S 1/00* (2006.01)
  *H04S 3/00* (2006.01)

(56) References Cited

U.S. PATENT DOCUMENTS

| | | | |
|---|---|---|---|
| 6,178,317 B1 * | 1/2001 | Kroeger et al. | 455/296 |
| 6,446,037 B1 * | 9/2002 | Fielder et al. | 704/229 |
| 6,636,474 B1 * | 10/2003 | Tanaka et al. | 369/275.3 |
| 7,649,856 B2 * | 1/2010 | Sung et al. | 370/286 |
| 2004/0100937 A1 | 5/2004 | Chen | |
| 2005/0165911 A1 | 7/2005 | Homiller | |
| 2005/0246178 A1 * | 11/2005 | Fejzo | 704/500 |
| 2006/0072627 A1 | 4/2006 | Kugumiya et al. | |
| 2006/0203924 A1 | 9/2006 | Casaccia et al. | |
| 2008/0004883 A1 * | 1/2008 | Vilermo et al. | 704/500 |
| 2008/0159186 A1 * | 7/2008 | Steer | 370/297 |
| 2008/0211901 A1 * | 9/2008 | Civanlar et al. | 348/14.09 |

FOREIGN PATENT DOCUMENTS

| | | | |
|---|---|---|---|
| JP | 10336645 A | 12/1998 | |
| JP | 2000032404 A | 1/2000 | |
| JP | 2000115094 A | 4/2000 | |
| JP | 2000244429 A | 9/2000 | |
| JP | 2002010251 A | 1/2002 | |
| JP | 2003009125 A | 1/2003 | |
| JP | 2003-507913 T | 2/2003 | |
| JP | 2003037571 A | 2/2003 | |
| JP | 2006-508587 T | 3/2006 | |
| JP | 2006-109000 A | 4/2006 | |
| JP | 2006311567 A | 11/2006 | |
| JP | 2007-528149 T | 10/2007 | |
| JP | 2008-515358 T | 5/2008 | |
| WO | 0113375 A1 | 2/2001 | |
| WO | 02052860 A1 | 7/2002 | |
| WO | 2004093356 A1 | 10/2004 | |

OTHER PUBLICATIONS

Faller C et al: "Technical advances in digital audio radio broadcasting" Proceedings of the IEEE, IEEE. New York, US LNKD-DOI: 10.1109/JPROC.2002.800718, vol. 90, No. 8, Aug. 1, 2002, pp. 1303-1333, XP011065048.

Eunmi Oh et al: "Fine Grain Scalability in MPEG-4 BSAC multi-channel audio coding" ITU Study Group 16—Video Coding Experts Group—ISO/IEC MPEG & ITU-T VCEG (ISO/IEC JTC1/SC29/WG11 and ITU-T SG16 Q6), XX. XX, No. M11217, Oct. 14, 2004, pp. 1-7.

European Search Report EP 10151019 dated May 31, 2010.

* cited by examiner

SOUND DATA TRANSMITTING OPERATION

SOUND DATA TRANSMITTING APPARATUS, SOUND DATA TRANSMITTING METHOD, SOUND DATA RECEIVING APPARATUS, AND SOUND DATA RECEIVING APPARATUS

CROSS-REFERENCE TO RELATED APPLICATION

The present application claims priority from Japanese Patent Application No. JP 2009-012749 filed in the Japanese Patent Office on Jan. 23, 2009, the entire content of which is incorporated herein by reference.

BACKGROUND OF THE INVENTION

1. Field of the Invention

The present invention relates to a sound data transmitting apparatus, a sound data transmitting method, a sound data receiving apparatus, and a sound data receiving method, and, more particularly to a sound data transmitting apparatus and the like for transmitting digital sound data using two kinds of transmission channels.

2. Description of the Related Art

For example, as disclosed in JP-A-2006-109000, there is known an AV system that transmits data (image data and sound data) of AV (Audio Visual) contents from a source apparatus (e.g., a disk recorder or a tuner for terrestrial digital broadcast) as a transmitting apparatus to a sync apparatus (e.g., a television) as a receiving apparatus.

SUMMARY OF THE INVENTION

In the recent digital interface that transmits AV contents, a transmission band is strained because it is necessary to simultaneously transmit an audio signal and a video signal, a control signal for controlling apparatuses, and the like.

Therefore, for example, a system is conceivable that uses a transmission channel A that has high reliability and can guarantee, during reception, reproduction of data having resolution same as that during transmission but does not have a very high data transmission band and a transmission channel B that may be unable to guarantee, during reception, reproduction of data having resolution same as that during transmission but has a sufficiently high data transmission band. In this case, for example, sound data, control data, and important components of image data are transmitted through the transmission channel A and the other components of the image data are transmitted through the transmission channel B. Even in this system, as a data amount increases because the sound data is multi-channel data or a quality of the sound data is improved, a data amount of the image data on the transmission channel A is reduced, leading to deterioration in an image quality.

Thus, it is desirable to enable, even when a data amount of sound data increases, satisfactory transmission of the sound data without affecting transmission of other data such as image data.

According to an embodiment of the present invention, there is provided a sound data transmitting apparatus that transmits digital sound data using a first transmission channel for transmitting a transmission signal of a first form guaranteed to obtain, as reception data, data same as transmission data and a second transmission channel for transmitting a transmission signal of a second form not guaranteed to obtain, as reception data, data same as transmission data, the sound data transmitting apparatus including:

a data separating unit that separates transmission digital sound data into first sound data that should be transmitted through the first transmission channel and second sound data that should be transmitted through the second transmission channel;

a first transmission processing unit that processes the first sound data separated by the data separating unit to obtain the transmission signal of the first form;

a second transmission processing unit that processes the second sound data separated by the data separating unit to obtain the transmission signal of the second form; and a data transmitting unit that transmits, through the first transmission channel, the transmission signal of the first form obtained by the first transmission processing unit and transmits, through the second transmission channel, the transmission signal of the second form obtained by the second transmission processing unit.

According to another embodiment of the present invention, there is provided a sound data receiving apparatus that receives digital sound data using a first transmission channel for transmitting a transmission signal of a first form guaranteed to obtain, as reception data, data same as transmission data and a second transmission channel for transmitting a transmission signal of a second form not guaranteed to obtain, as reception data, data same as transmission data, the sound data receiving apparatus including:

a data receiving unit that receives the transmission signal of the first form through the first transmission channel and receives the transmission signal of the second form through the second transmission channel;

a first reception processing unit that processes the transmission signal of the first form received by the data receiving unit to obtain first sound data;

a second reception processing unit that processes the transmission signal of the second form received by the data receiving unit to obtain second sound data; and a data combining unit that combines the first sound data obtained by the first reception processing unit and the second sound data obtained by the second reception processing unit to obtain reception digital sound data.

In the embodiments of the present invention, the transmission of the digital sound data is performed by using the first transmission channel and the second transmission channel. The first transmission channel is a transmission channel for transmitting the transmission signal of the first form guaranteed to obtain, as reception data, data same as transmission data and has, for example, a first transmission band. The second transmission channel is a transmission channel for transmitting the transmission signal of the second form not guaranteed to obtain, as reception data, data same as transmission data land has, for example, a second transmission band wider than the first transmission band. The first and second transmission channels may be either wired or wireless.

For example, the transmission signal of the first form is a transmission signal obtained by at least applying processing for adding data for error correction and digital modulation processing (e.g., QPSK or 16QAM) to the transmission data. For example, the signal of the second form is a transmission signal obtained by at least treating the transmission data as straight binary data, which keeps a relation between an LSB (Least Significant Bit) and an MSB (Most Significant Bit), and simulatively applying analog modulation (AM, FM, etc.) to the transmission data.

In the sound data transmitting apparatus, the data separating unit separates the transmission digital sound data into the first sound data that should be transmitted through the first transmission channel and the second sound data that should be transmitted through the second transmission channel.

For example, when the transmission digital sound data is LPCM (Linear PCM) sound data, the data separating unit separates, for each sample data of the LPCM sound data, higher-order predetermined bits as the first sound data and separates the remaining bits as the second sound data. For example, in a setting for separating higher-order 16 bits as the first sound data, in the case of 16-bit LPCM sound data, the data separating unit separates all the bits as the first sound data and separates no bit as the second sound data. For example, in the case of 24-bit LPCM sound data, the data separating unit separates higher-order 16 bits as the first sound data and separates the remaining 8 bits (lower-order 8 bits) as the second sound data.

For example, when the transmission digital sound data is multi-channel sound data, the data separating unit separates sound data of a predetermined channel as the first sound data and separates sound data of the remaining channels as the second sound data. For example, in a 5.1-channel surround system, the data separating unit separates, as the first sound data, sound data of left (front), center, and right (front) channels for main sound among left (front), center, right (front), left (rear), right (rear), LFE (Low Frequency Effect) channels and separates, as the second sound data, sound data of the remaining left (rear), right (rear), LFE channels.

In the sound data transmitting apparatus, the first transmission processing unit processes the first sound data to obtain the transmission signal of the first form. The transmission signal of the first form is, as explained above, a transmission signal guaranteed to obtain, as reception data, data same as transmission data. In the sound data transmitting apparatus, the second transmission processing unit processes the second sound data to obtain the transmission signal of the second form. The transmission signal of the second form is, as explained above, a transmission signal not guaranteed to obtain, as reception data, data same as transmission data.

In the sound data transmitting apparatus, the data transmitting unit transmits, through the first transmission channel, the transmission signal of the first form obtained by the first transmission processing unit and transmits, through the second transmission channel, the transmission signal of the second form obtained by the second transmission processing unit.

For example, in the sound data transmitting apparatus, a data-information supplying unit supplies, to a reception side, data information for determining whether the transmission digital sound data includes the second sound data besides the first sound data. Consequently, the reception side can determine, on the basis of the data information, whether reception processing for obtaining the second sound data should be performed and processing for combining the second sound data with the first sound data should be performed. This makes it possible to appropriately and efficiently obtain reception sound data.

In the sound data receiving apparatus, the data receiving unit receives the transmission signal of the first form through the first transmission channel and receives the transmission signal of the second form through the second transmission channel. It goes without saying that, in some case, as explained above, the second sound data is not included in the transmission digital sound signal and the sound signal of the second form is not transmitted from the sound data transmitting apparatus.

In the sound data receiving apparatus, the first reception processing unit processes the transmission signal of the first form received by the data receiving unit to obtain the first sound data. In the sound data receiving apparatus, the second reception processing unit processes the transmission signal of the second form received by the data receiving unit to obtain the second sound data.

In the sound data receiving apparatus, the data combining unit combines the first sound data obtained by the first reception processing unit and the second sound data obtained by the second reception processing unit to obtain the reception digital sound data. For example, when the reception digital sound data is LPCM sound data, the data combining unit performs, for each sample data, data combination with the first sound data obtained by the first reception processing unit set as higher-order bits and with the second sound data obtained by the second reception processing unit set as lower-order bits. For example, when the reception digital sound data is multi-channel sound data, the data combining unit performs data combination with the first sound data obtained by the first reception processing unit set as sound data of a first channel (e.g., in the case of the 5.1-channel surround system, sound data of left (front), center, and right (front) channels) and with the second sound data obtained by the second reception processing unit set as sound data of a second channel (e.g., in the case of the 5.1-channel surround system, sound data of left (rear), right (rear), and LFE channels).

In the embodiments of the present invention, as explained above, the transmission digital sound data is separated into the first sound data and the second sound data, which are respectively transmitted through the first transmission channel and the second transmission channel. Therefore, when a data amount of the transmission digital sound data increases because sound data is multi-channel sound data or a quality of the sound data is improved, it is possible to transmit the increased amount of the transmission digital sound data as the second sound data through the second transmission channel rather than the first transmission channel. Therefore, even when the data amount of the transmission digital sound signal increases, it is possible to satisfactorily transmit the transmission digital sound data without affecting the transmission of the other data such as image data transmitted through the first transmission channel.

According to the embodiments of the present invention, in the sound data transmitting apparatus that transmits digital sound data using the first transmission channel for transmitting the transmission signal of the first form guaranteed to obtain, as reception data, data same as transmission data and the second transmission channel for transmitting the transmission signal of the second form not guaranteed to obtain, as reception data, data same as transmission data, the transmission digital sound data is separated into the first sound data and the second sound data, which are respectively transmitted through the first transmission channel and the second transmission channel. Therefore, even when a data amount of the transmission digital sound data increases, it is possible to satisfactorily transmit the transmission digital sound data without affecting the transmission of the other data such as image data transmitted through the first transmission channel.

DESCRIPTION OF THE PREFERRED EMBODIMENTS

Modes for carrying out the present invention (hereinafter referred to as embodiments) are explained below. The embodiments are explained in order described below.

1. First Embodiment
2. Second Embodiment
3. Modifications

1. First Embodiment

Overall Configuration Example of a Sound Transmission System

Figure 1:
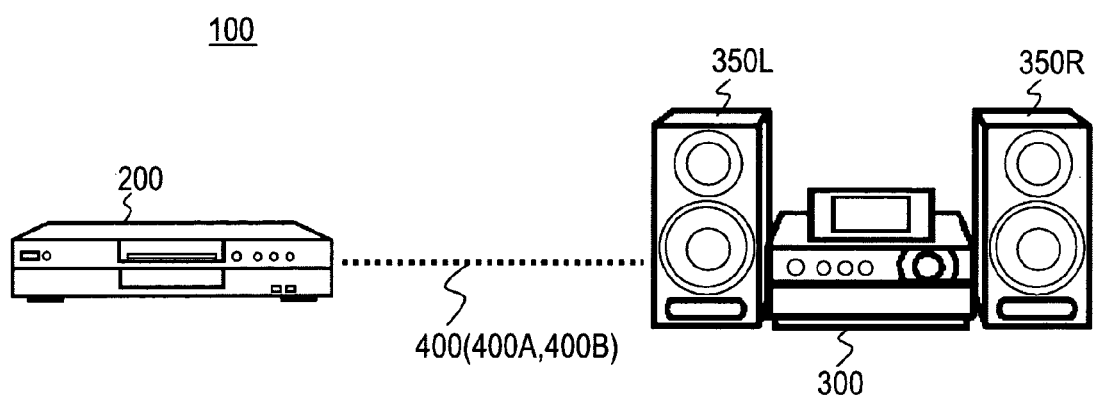
FIG. 1 is a block diagram of a configuration example of a sound transmission system according to a first embodiment of the present invention.

FIG. 1 is a diagram of the overall configuration of a sound transmission system 100 according to a first embodiment of the present invention. The sound transmission system 100 includes a sound reproducing apparatus 200 as a source apparatus, a sound output apparatus 300 as a sync apparatus, and a transmission channel 400.

The sound reproducing apparatus 200 reproduces digital sound data from a recording medium such as a nonvolatile memory, a magnetic disk, or an optical disk and transmits the digital sound data to the sound output apparatus 300 through the transmission channel 400. The sound reproducing apparatus 200 configures a sound-data transmitting apparatus.

Examples of the nonvolatile memory include an EEPROM (Electrically Erasable Programmable Read-Only Memory) and EPROM (Erasable Programmable ROM). Examples of the magnetic disk include a hard disk and a disc-like magnetic disk. Examples of the optical disk include a CD (Compact Disc), a DVD (Digital Versatile Disc), and a BD (Blu-Ray Disc (registered trademark)).

A left channel speaker 350L and a right channel speaker 350R are connected to the sound output apparatus 300. The sound output apparatus 300 receives the digital sound data transmitted from the sound reproducing apparatus 200 through the transmission channel 400 and drives the speakers 350L and 350R to output sound on the basis of the digital sound data. The sound output apparatus 300 configures a sound data receiving apparatus.

The transmission channel 400 is used to transmit the digital sound data from the sound reproducing apparatus 200 to the sound output apparatus 300. The transmission channel 400 may be either wireless or wired. The transmission channel 400 includes a transmission channel 400A (a first transmission channel) and a transmission channel 400B (a second transmission channel). For example, when the transmission channels 400A and 400B are wireless transmission channels, the transmission channels 400A and 400B are separated from each other in terms of frequency or time. For example, when the transmission channels 400A and 400B are wired transmission channels, the transmission channels 400A and 400B are formed by separate lines.

The transmission channel 400A is a transmission channel having high reliability. Specifically, the transmission channel 400A is a transmission channel for transmitting a transmission signal of a first form guaranteed to obtain, as reception data, data same as transmission data and has a first transmission band (data transmission capacity).

The first transmission band is not so large. For example, the first transmission band is a transmission band enough for transmitting a current general audio format. The general audio format includes a 16-bit 48 kHz stereo LPCM signal and a compressed sound format signal mapped to SPDIF (Sony Philips Digital InterFace). The transmission signal of the first form is, for example, a transmission signal obtained by at least applying processing for adding data for error correction and digital modulation processing (e.g., QPSK or 16QAM) to transmission data.

The transmission channel 400B is a transmission channel having low reliability compared with the transmission channel 400A. Specifically, the transmission channel 400B is a transmission channel for transmitting a transmission signal of a second form not guaranteed to obtain, as reception data, data same as transmission data and has a second transmission band (data transmission capacity).

The second transmission band is larger than the first transmission band and is a sufficiently large transmission band. The transmission signal of the second form is a transmission signal that is not guaranteed to obtain, as reception data, data same as transmission data as explained above but is expected to obtain reception data within a range of a certain degree of error with respect to the transmission data. The transmission signal of the second form is, for example, a transmission signal obtained by at least treating the transmission data as straight binary data, which keeps a relation between a LSB and an MSB, and simulatively applying analog modulation (AM, FM, etc.) to the transmission data.

The sound transmission system 100 shown in FIG. 1 includes the transmission channels 400A and 400B as explained above. Therefore, in the sound reproducing apparatus 200, the transmission digital sound data (the stereo LPCM signal) is separated into first sound data that should be transmitted through the transmission channel 400A and second sound data that should be transmitted through the transmission channel 400B. Specifically, in the sound reproducing apparatus 200, for each sample data of LPCM sound data, higher-order 16 bits are separated as the first sound data and the remaining bits are separated as the second sound data.

Therefore, when the transmission digital sound data is 16-bit LPCM sound data, all the bits are separated as the first sound data and no bit is separated as the second sound data. When the transmission digital sound data is bit-expanded 24-bit LPCM sound data, higher-order 16 bits are separated as the first sound data and the remaining 8 bits (lower-order 8 bits) are separated as the second sound data.

In the sound reproducing apparatus 200, for example, at least processing for adding data for error correction and digital modulation processing (e.g., QPSK or 16QAM) are applied to the separated first sound data and the transmission signal of the first form is obtained. In the sound reproducing apparatus 200, for example, at least, the separated second sound data is as straight binary data, which keeps a relation between an LSB and an MSB, and simulatively subjected to analog modulation (AM, FM, etc.) and the transmission signal of the second form is obtained.

In the sound reproducing apparatus 200, the transmission signal of the first form is transmitted to the sound output apparatus 300 through the transmission channel 400A and the transmission signal of the second form is transmitted to the sound output apparatus 300 through the transmission channel 400B.

In the sound output apparatus 300, the transmission signal of the first form is received from the sound reproducing apparatus 200 through the transmission channel 400A and the transmission signal of the second form is received from the sound reproducing apparatus 200 through the transmission channel 400B.

In the sound output apparatus 300, the received transmission signal of the first form is processed and the first sound data is obtained. The received transmission signal of the second form is processed and the second sound data is obtained. In the sound output apparatus 300, for each sample data, with the first sound data set as higher-order bits and the second sound data set as lower-order bits, the first sound data and the second sound data are combined and reception digital sound data is obtained.

In this case, the transmission digital sound data in the sound reproducing apparatus 200 is 16-bit LPCM sound data, the transmission signal of the second form is not transmitted from the sound reproducing apparatus 200 through the transmission channel 400B. In this case, the first sound data is directly obtained as the reception digital sound data (the 16-bit LPCM sound data).

In this case, when the transmission digital sound data in the sound reproducing apparatus 200 is the bit-expanded 24-bit LPCM sound data, the transmission signal of the second form is transmitted from the sound reproducing apparatus 200 through the transmission channel 400B. In this case, the first sound data and the second sound data are combined and reception digital sound data (the 24-bit LPCM sound data) is obtained.

Before sound data is transmitted, information concerning bit width (N) of the transmission digital sound data is supplied from the sound reproducing apparatus 200 to the sound output apparatus 300. The information is information for determining whether the transmission digital sound data is the 16-bit LPCM sound data or the bit-expanded 24-bit LPCM sound data.

Consequently, the sound output apparatus 300 can recognize whether the transmission digital sound data is the 16-bit LPCM sound data or the 24-bit LPCM sound data. Therefore, the sound output apparatus 300 can determine whether reception processing for obtaining the second sound data should be performed and processing for combining the second sound data with the first sound data should be performed. This makes it possible to appropriately and efficiently obtain the reception digital sound data.

Figure 2:
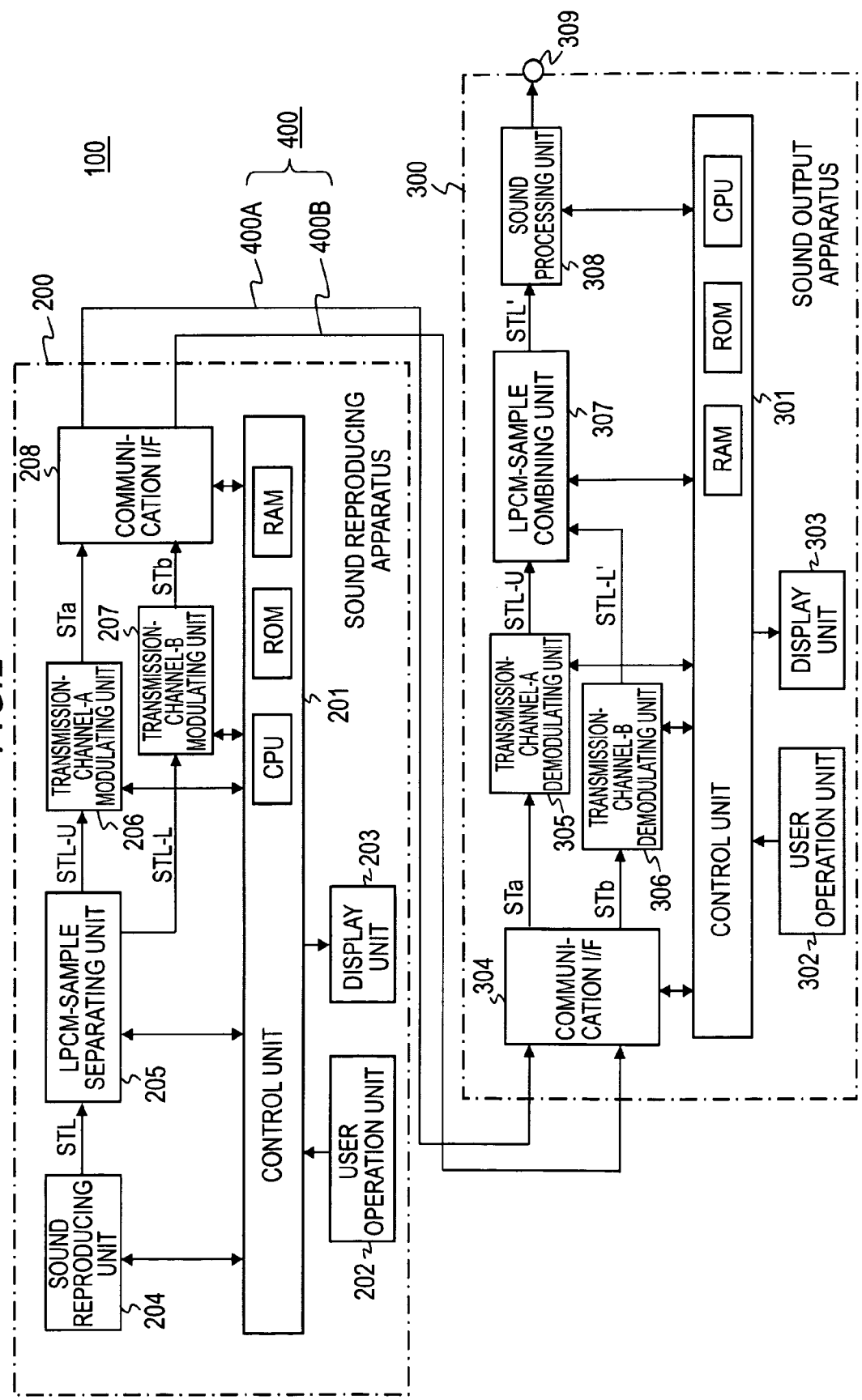
FIG. 2 is a block diagram of a configuration example of a sound reproducing apparatus and a sound output apparatus included in the sound transmission system.

Configuration Example of the Sound Reproducing Apparatus and the Sound Output Apparatus A specific configuration example of the sound reproducing apparatus 200 and the sound output apparatus 300 is explained below. FIG. 2 is a diagram of the configuration example of the sound reproducing apparatus 200 and the sound output apparatus 300.

First, the sound reproducing apparatus 200 is explained. The sound reproducing apparatus 200 includes, as shown in FIG. 2, a control unit 201, a user operation unit 202, a display unit 203, a sound reproducing unit 204, an LPCM-sample separating unit 205, a transmission-channel-A modulating unit 206, a transmission-channel-B modulating unit 207, and a communication interface (communication I/F) 208.

The control unit 201 controls the operation of the units of the sound reproducing apparatus 200. The control unit 201 includes a CPU, a ROM, and a RAM. The ROM has stored therein a control program and the like for the CPU. The RAM is used for, for example, temporarily storing data necessary for control processing by the CPU. The CPU expands, on the RAM, a computer program and data read out from the ROM, starts the computer program, and controls the operation of the units of the sound reproducing apparatus 200.

The user operation unit 202 and the display unit 203 are included in a user interface of the sound reproducing apparatus 200 and connected to the control unit 201. The user operation unit 202 includes keys, buttons, and a dial arranged on a not-shown housing of the sound reproducing apparatus 200 or a remote controller. The display unit 203 includes, for example, an LCD (Liquid Crystal Display).

Although not shown in the figure, the sound reproducing unit 204 reproduces digital sound data of predetermined contents from a recording medium inserted therein such as a nonvolatile memory, a magnetic disk, or an optical disk and outputs an LPCM sound data stream STL as transmission digital sound data. In this embodiment, the LPCM sound data stream STL is 16-bit LPCM sound data or bit-expanded 24-bit LPCM sound data.

The LPCM-sample separating unit 205 separates, for each sample data of the LPCM sound data stream STL, higher-order 16-bits as first sound data and separates the remaining bits as second sound data. For example, when the LPCM sound data stream STL is the 16-bit LPCM sound data, the LPCM-sample separating unit 205 separates all the bits as the first sound data and separates no bit as the second sound data. For example, when the LPCM sound data stream STL is the bit-expanded 24-bit LPCM sound data, the LPCM-sample separating unit 205 separates the higher-order 16 bits as the first sound data and separates the remaining 8 bits (lower-order 8 bits) as the second sound data. The LPCM-sampling separating unit 205 configures a data separating unit.

The transmission-channel-A modulating unit 206 processes the first sound data (an LPCM higher-order bit stream STL-U) obtained by the LPCM-sample separating unit 205 to generate a transmission signal STa of a first form. In this case, for example, the transmission-channel-A modulating unit 206 at least applies processing for adding data for error correction and digital modulation processing to the first sound data to obtain the transmission signal STa of the first form. The transmission signal STa of the first form is a transmission signal guaranteed to obtain, as reception data, data same as transmission data. The transmission-channel-A modulating unit 206 configures a first transmission processing unit.

The transmission-channel-B modulating unit 207 processes the second sound data (an LPCM lower-order bit stream STL-L) obtained by the LPCM-sample separating unit 205 to generate a transmission signal STb of a second form. In this case, for example, the transmission-channel-B modulating unit 207 at least treats the second sound data as straight binary data, which keeps a relation between an LSB and an MSB, and simulatively applies analog modulation (AM, FM, etc.) to the second sound data to obtain the transmission signal STb of the second form. The transmission-channel-B modulating unit 207 configures a second transmission processing unit.

The transmission signal STb of the second form is a transmission signal not guaranteed to obtain, as reception data, data same as transmission data.

For example, when the transmission signal STb of the second form transmits 8-bit data through AM modulation, on a transmission side, 0b00000000 is encoded as an amplification value "0", 0b11111111 is encoded as an amplification value "1", and 0b10000000 is encoded as an amplification value "0.5". However, since this AM signal is affected by noise or the like in the transmission channel 400B, on a reception side, lower-order information is likely to be spoiled during decoding. In some case, the amplification value is "0.25 to 0.75".

The communication interface 208 transmits the transmission signal STa of the first form obtained by the transmission-channel-A modulating unit 206 to the sound output apparatus 300 through the transmission channel 400A. The communication interface 208 transmits the transmission signal STb of the second form obtained by the transmission-channel-B modulating unit 207 to the sound output apparatus 300 through the transmission channel 400B. The communication interface 208 configures a data transmitting unit.

Before transmitting the transmission signals STa and STb to the sound output apparatus 300, the communication interface 208 supplies information concerning bit width (N) of the LPCM sound data stream STL (the transmission digital sound data) through the transmission channel 400 under the control by the control unit 201. In this sense, the communication interface 208 configures a data-information supplying unit.

The sound output apparatus 300 is explained below. The sound output apparatus 300 includes, as shown in FIG. 2, a control unit 301, a user operation unit 302, a display unit 303, a communication interface (communication I/F) 304, a transmission-channel-A demodulating unit 305, a transmission-channel-B demodulating unit 306, and an LPCM-sample combining unit 307. The sound output apparatus 300 further includes, as shown in FIG. 2, a sound processing unit 308 and a sound output terminal 309.

The control unit 301 controls the operation of the units of the sound output apparatus 300. The control unit 301 includes a CPU, a ROM, and a RAM. The ROM has stored therein a control program and the like for the CPU. The RAM is used for, for example, temporarily storing data necessary for control processing by the CPU. The CPU expands, on the RAM, a computer program and data read out from the ROM and starts the computer program to control the operation of the units of the sound output apparatus 300.

The user operation unit 302 and the display unit 303 are included in a user interface of the sound output apparatus 300 and connected to the control unit 301. The user operation unit 302 includes keys, buttons, and a dial arranged on a not-shown housing of the sound output apparatus 300 or a remote controller. The display unit 303 includes, for example, an LCD (Liquid Crystal Display).

The communication interface 304 receives the transmission signal STa of the first form from the sound reproducing apparatus 200 through the transmission channel 400A. The communication interface 304 receives the transmission signal STb of the second form from the sound reproducing apparatus 200 through the transmission channel 400B. The communication interface 304 configures a data receiving unit.

Before receiving the transmission signals STa and STb from the sound reproducing apparatus 200, the communication interface 304 acquires information concerning bit width (N) of the LPCM sound data stream STL (the transmission digital sound data) in the sound reproducing apparatus 200 through the transmission channel 400. In this sense, the communication interface 304 configures a data-information acquiring unit.

The communication interface 304 supplies this bit width (N) information to the control unit 301. The control unit 301 recognizes, on the basis of this information, whether the transmission digital sound data, i.e., the reception digital sound data is 16-bit LPCM sound data or 24-bit LPCM sound data and accurately performs operation control for the units.

The transmission-channel-A demodulating unit 305 processes the transmission signal STa of the first form received by the communication interface 304 to obtain first sound data (the LPCM higher-order bit stream STL-U). The transmission-channel-A demodulating unit 305 performs processing (digital demodulation processing, error correction processing, etc.) of a process opposite to the processing of the transmission-channel-A modulating unit 206 of the sound reproducing apparatus 200. As explained above, the transmission signal STa of the first form is a transmission signal guaranteed to obtain, as reception data, data same as transmission data. Therefore, the first sound data obtained by the transmission-channel-A demodulating unit 305 is data same as the first sound data input to the transmission-channel-A modulating unit 206 of the sound reproducing apparatus 200. The transmission-channel-A demodulating unit 305 configures a first reception processing unit.

The transmission-channel-B demodulating unit 306 processes the transmission signal STb of the second form received by the communication interface 304 to obtain second sound data (an LPCM lower-order bit stream STL-L'). The transmission-channel-B demodulating unit 306 performs processing (analog demodulation processing, quantization processing, etc.) opposite to the processing of the transmission-channel-B modulating unit 207 of the sound reproducing apparatus 200. As explained above, the transmission signal STb of the second form is a transmission signal not guaranteed to obtain, as reception data, data same as transmission data. Therefore, the second sound data obtained by the transmission-channel-B demodulating unit 306 is data within a range of a certain degree of error with respect to the second sound data input to the transmission-channel-B modulating unit 207 of the sound reproducing apparatus 200. The transmission-channel-B demodulating unit 306 configures a second reception processing unit.

The LPCM-sample combining unit 307 combines, for each sample data, the first sound data from the transmission-channel-A demodulating unit 305 and the second sound data from the transmission-channel-B demodulating unit 306 with the first sound data set as higher-order bits and the second sound data set as lower-order bits to obtain sound data (an LPCM sound data stream STL'). The LPCM-sample combining unit 307 configures a data combining unit.

When the transmission digital sound data in the sound reproducing apparatus 200 is 16-bit LPCM sound data, the transmission signal of the second form is not transmitted from the sound reproducing apparatus 200 through the transmission channel 400B. In this case, the first sound data is directly obtained as the reception digital sound data (the 16-bit LPCM sound data). When the transmission digital sound data in the sound reproducing apparatus 200 is bit-expanded 24-bit LPCM sound data, the transmission signal of the second form is transmitted from the sound reproducing apparatus 200 through the transmission channel 400B. In this case, the first sound data (higher-order 16 bits) and the second sound data (lower-order 8 bits) are combined and reception digital sound data (24-bit LPCM sound data) is obtained.

The sound processing unit 308 applies necessary processing such as amplification or D/A conversion to the reception digital sound data obtained by the LPCM-sample combining unit 307. The sound processing unit 308 outputs sound signals of the left and right channels after the processing to the output terminal 309 and drives the speakers of the channels connected to the output terminal 309.

Operation Example of the Sound Transmission System

The operation of the sound transmission system 100 shown in FIG. 2 is explained below. Before the start of transmission of the sound data from the sound reproducing apparatus 200 to the sound output apparatus 300, the sound reproducing apparatus 200 notifies the sound output apparatus 300 of the information concerning the bit width (N) of the transmission digital sound data. The sound output apparatus 300 recognizes the information.

Figure 3:
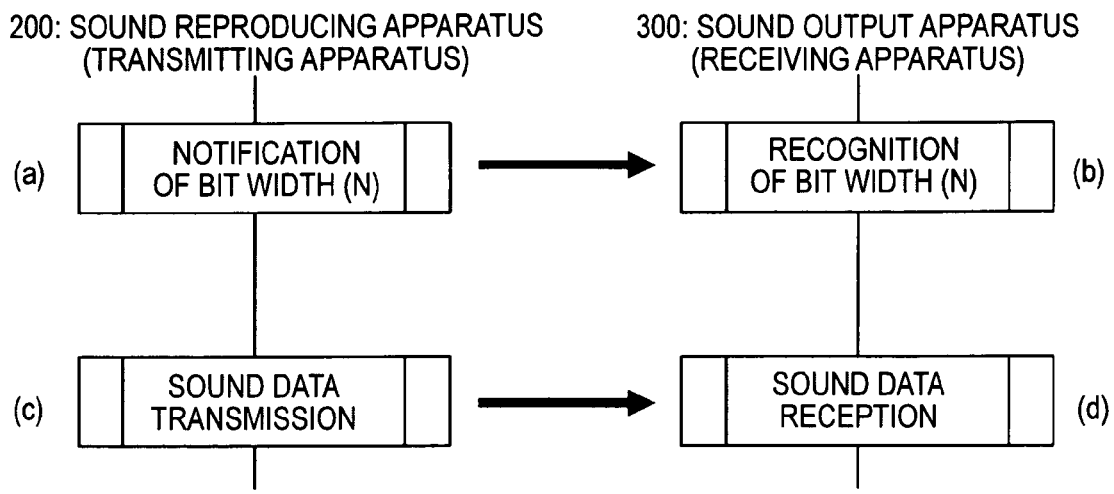
FIG. 3 is a sequence chart of a flow of operation of the sound reproducing apparatus and the sound output apparatus during the start of transmission of sound data.

FIG. 3 is a sequence chart of a flow of operation during the start of transmission of the sound data. (a) The sound reproducing apparatus 200 supplies the information concerning the bit width (N) of the transmission digital sound data to the sound output apparatus 300 and notifies the sound output apparatus 300 of the information. (b) The sound output apparatus 300 acquires the information concerning the bit width (N) of the transmission digital sound data from the sound reproducing apparatus 200 and recognizes the information. Thereafter, (c) the sound reproducing apparatus 200 transmits sound data to the sound output apparatus 300. (d) The sound output apparatus 300 receives the sound data transmitted from the sound reproducing apparatus 200.

First, in the following explanation, the transmission digital sound data (the LPCM sound data stream STL) output from the sound reproducing unit 204 of the sound reproducing apparatus 200 is 16-bit LPCM sound data. In this case, the LPCM-sample separating unit 205 separates, for each sample data, all bits of the transmission digital sound data as the first sound data (the LPCM higher-order bit stream STL-U) and does not output the second sound data.

Since the LPCM-sample separating unit 205 does not output the second sound data, processing for obtaining the transmission signal STb of the second form in the transmission-channel-B modulating unit 207, processing for transmitting the transmission signal STb of the second form from the communication interface 208, and the like are not performed.

The LPCM-sample separating unit 205 supplies the separated first sound data (LPCM higher-order bit stream STL-U) to the transmission-channel-A modulating unit 206. The transmission-channel-A modulating unit 206 processes the first sound data to generate the transmission signal STa of the first form. The communication interface 208 transmits the transmission signal STa of the first form to the sound output apparatus 300 through the transmission channel 400A.

The communication interface 304 of the sound output apparatus 300 receives the transmission signal STa of the first form transmitted from the sound reproducing apparatus 200 through the transmission channel 400A. The sound output apparatus 300 recognizes in advance, according to the information concerning the bit width (N) notified from the sound reproducing apparatus 200 before the start of transmission, that the transmission digital sound data is the 16-bit LPCM sound data and the transmission signal STb of the second form is not transmitted. Therefore, processing for receiving the transmission signal STb of the second form in the communication interface 304, processing for obtaining the second sound data (the LPCM lower-order bit stream STL-L') in the transmission-channel-B demodulating unit 306, processing for combining data in the LPCM-sample combining unit 307, and the like are not performed.

The communication interface 304 supplies the received transmission signal STa of the first form to the transmission-channel-A demodulating unit 305. The transmission-channel-A demodulating unit 305 processes the transmission signal STa of the first form to obtain the first sound data (the LPCM higher-order bit stream STL-U). The LPCM-sample combining unit 307 directly outputs the first sound data as the reception digital sound data STL' (the 16-bit LPCM sound data).

The LPCM-sample combining unit 307 supplies the reception digital sound data STL' to the sound processing unit 308. The sound processing unit 308 applies the necessary processing such as amplification or D/A conversion to the reception digital sound data STL' and outputs sound signals of the left and right channels after the processing to the sound output terminal 309. Consequently, reproduced sound by the sound data (the 16-bit LPCM sound data) is obtained from the speakers 350L and 350R (not shown in FIG. 2, see FIG. 1) of the left and right channels connected to the sound output terminal 309.

In the following explanation, the transmission digital sound data (the LPCM sound data stream STL) output from the sound reproducing unit 204 of the sound reproducing apparatus 200 is the bit-expanded 24-bit LPCM sound data. The LPCM-sample separating unit 205 separates, for each sample data, higher-order 16 bits as the first sound data (the LPCM higher-order bit stream STL-U) and separates lower-order 8 bits as the second sound data (the LPCM lower-order bit stream STL-L).

The LPCM-sample separating unit 205 supplies the separated first sound data (LPCM higher-order bit stream STL-U) to the transmission-channel-A modulating unit 206. The transmission-channel-A modulating unit 206 processes the first sound data to generate the transmission signal STa of the first form. The communication interface 208 transmits the transmission signal STa of the first form to the sound output apparatus 300 through the transmission channel 400A.

The LPCM-sample separating unit 205 supplies the separated second sound data (LPCM lower-order bit stream STL-L) to the transmission-channel-B modulating unit 207. The transmission-channel-B modulating unit 207 processes the second sound data to generate the transmission signal STb of the second form. The communication interface 208 transmits the transmission signal STb of the second form to the sound output apparatus 300 through the transmission channel 400B.

The communication interface 304 of the sound output apparatus 300 receives the transmission signal STa of the first form from the sound reproducing apparatus 200 through the transmission channel 400A and receives the transmission signal STb of the second form from the sound reproducing apparatus 200 through the transmission channel 400B.

The communication interface 304 supplies the received transmission signal STa of the first form to the transmission-channel-A demodulating unit 305. The transmission-channel-A demodulating unit 305 processes the transmission signal STa of the first form to obtain the first sound data (the LPCM higher-order bit stream STL-U). The communication interface 304 supplies the received transmission signal STb of the second form to the transmission-channel-B demodulating unit 306. The transmission-channel-B demodulating unit 306 processes the transmission signal STb of the second form to obtain the second sound data (the LPCM lower-order bit stream STL-L').

The transmission-channel-A demodulating unit 305 supplies the obtained first sound data to the LPCM-sample combining unit 307. The transmission-channel-B demodulating unit 306 supplies the obtained second sound data to the LPCM-sample combining unit 307. The LPCM-sample combining unit 307 combines, for each sample data, the first sound data and the second sound data with the first sound data set as higher-order bits and the second sound data set as lower-order bits to obtain the reception digital sound data STL' (the 24-bit LPCM sound data).

The LPCM-sample combining unit 307 supplies the reception digital sound data STL' to the sound processing unit 308. The sound processing unit 308 applies the necessary processing such as amplification or D/A conversion to the reception digital sound data STL' and outputs sound signals of the left and right channels after the processing to the sound output terminal 309. Consequently, high-quality reproduced sound by the sound data (the 24-bit LPCM sound data) from the sound reproducing apparatus 200 is obtained from the speakers 350L and 350R (not shown in FIG. 2, see FIG. 1) of the left and right channels connected to the sound output terminal 309.

Figure 4:
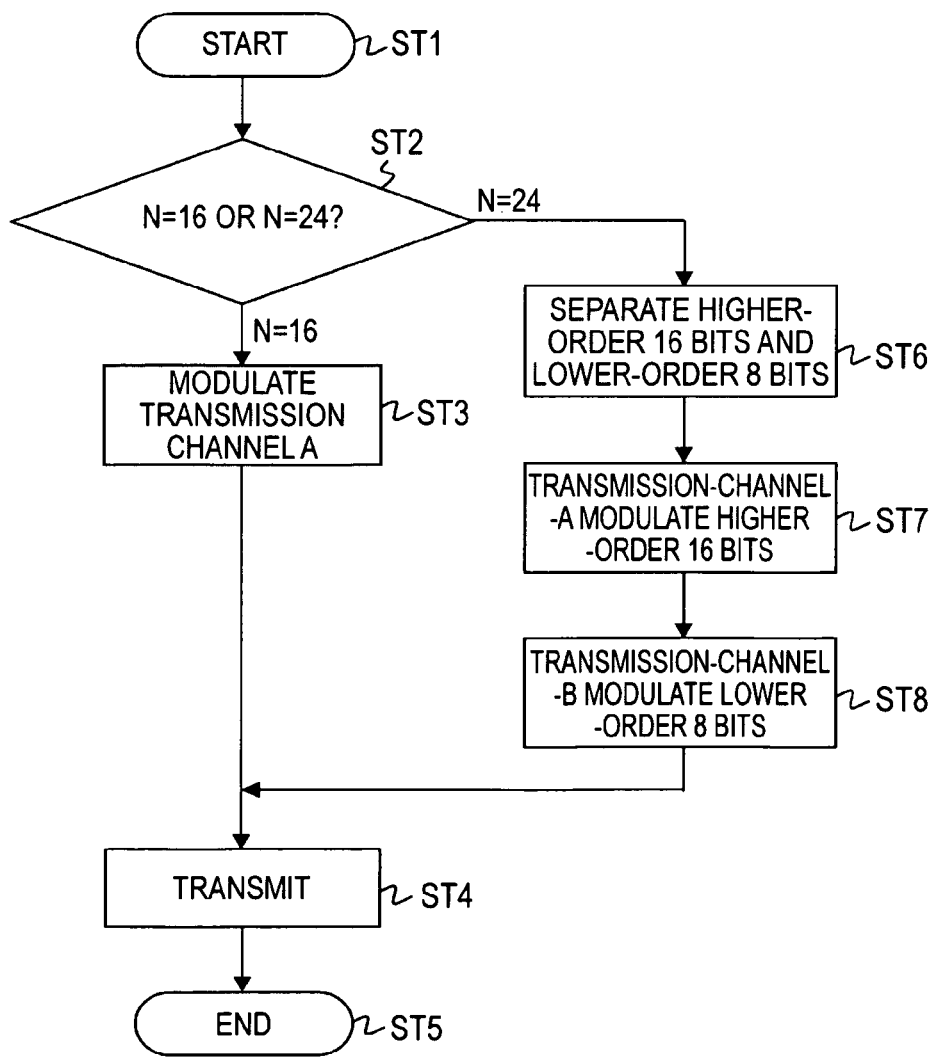
FIG. 4 is a flowchart for explaining a processing procedure of sound data transmitting operation in the sound reproducing apparatus.

A processing procedure of the sound data transmitting operation in the sound reproducing apparatus 200 is shown in a flowchart of FIG. 4. In the flowchart of FIG. 4, attention is paid to processing for one sample data. The same processing is repeatedly applied to respective sample data.

First, in step ST1, the sound reproducing apparatus 200 starts processing and then shifts to processing in step ST2. In step ST2, the sound reproducing apparatus 200 determines whether the bit width (N) of the transmission digital sound data is 16 or 24.

When N is 16, the sound reproducing apparatus 200 shifts to processing in step ST3. In step ST3, the sound reproducing apparatus 200 separates, with the LPCM-sample separating unit 205, all the bits of the transmission digital sound data STL as first sound data and forms, with the transmission-channel-A modulating unit 206, the transmission signal STa of the first form. In step ST4, the sound reproducing apparatus 200 transmits, with the communication interface 208, the transmission signal STa of the first form obtained in step ST3 to the sound output apparatus 300 through the transmission channel 400A. Thereafter, in step ST5, the sound reproducing apparatus 200 ends the processing.

When N is 24 in step ST2, the sound reproducing apparatus 200 shifts to processing in step ST6. In step ST6, the sound reproducing apparatus 200 separates, with the LPCM-sample separating unit 205, higher-order 16 bits of the transmission digital sound data STL as the first sound data and separates lower-order 8 bits as the second sound data.

In step ST7, the sound reproducing apparatus 200 processes, with the transmission-channel-A modulating unit 206, the first sound data separated in step ST6 to obtain the transmission signal STa of the first form. In step ST8, the sound reproducing apparatus 200 processes, with the transmission-channel-B modulating unit 207, the second sound data separated in step ST6 to obtain the transmission signal STb of the second form.

In step ST4, the sound reproducing apparatus 200 transmits, with the communication interface 208, the transmission signal STa of the first form obtained in step ST7 to the sound output apparatus 300 through the transmission channel 400A. In step ST4, the sound reproducing apparatus 200 transmits, with the communication interface 208, the transmission signal STb of the second form obtained in step ST8 to the sound output apparatus 300 through the transmission channel 400B. Thereafter, in step ST5, the sound reproducing apparatus 200 ends the processing.

Figure 5:
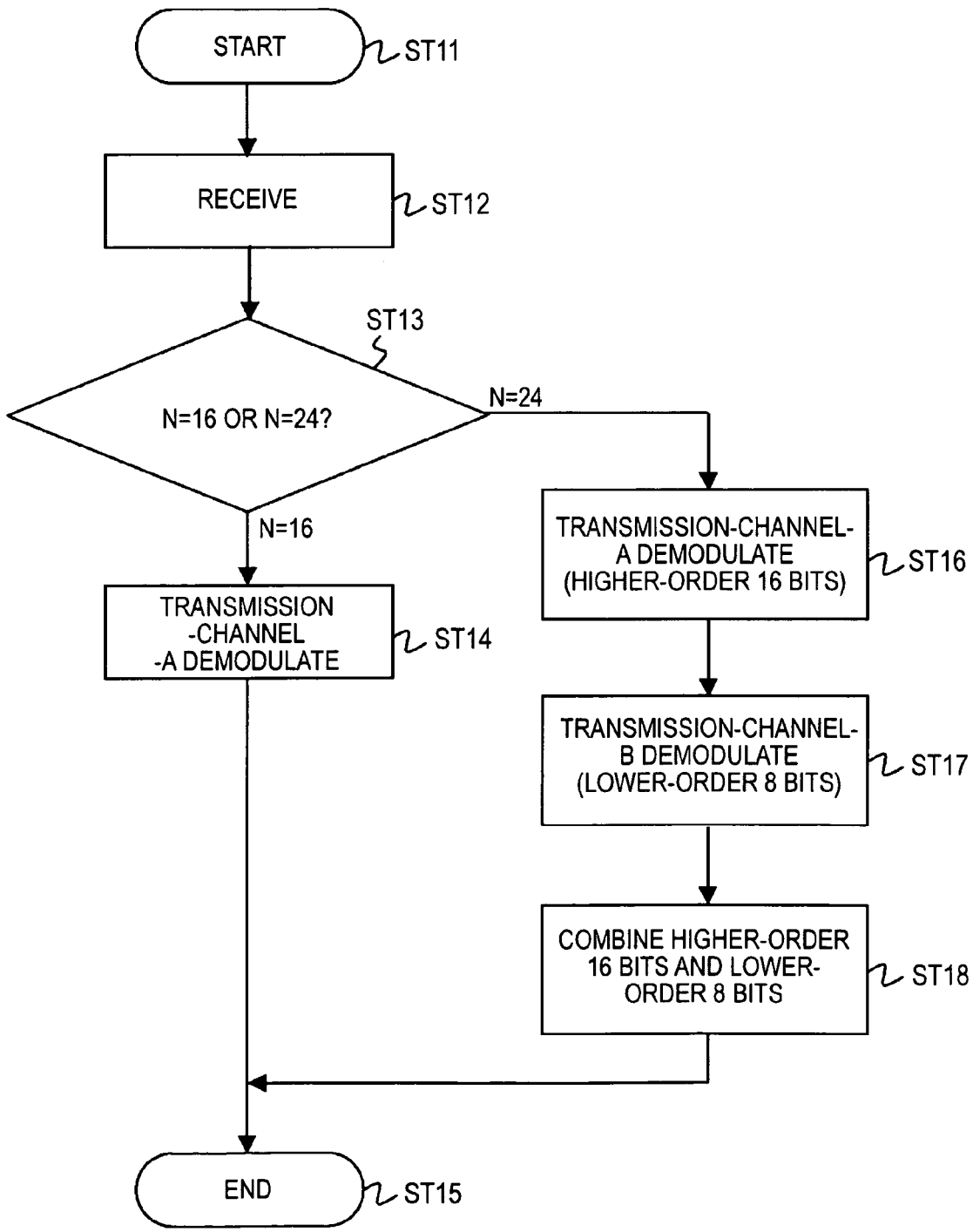
FIG. 5 is a flowchart for explaining a processing procedure of sound data receiving operation in the sound output apparatus.

A processing procedure of the sound data receiving operation in the sound output apparatus 300 is shown in a flowchart of FIG. 5. In the flowchart of FIG. 5, attention is paid to processing for one sample data. The same processing is repeatedly applied to respective sample data.

First, in step ST11, the sound output apparatus 300 starts processing and then shifts to processing in step ST12. In step ST12, the sound output apparatus 300 receives, with the communication interface 304, the transmission signals transmitted from the sound reproducing apparatus 200 through the transmission channel 400.

In this case, when the bit width (N) of the transmission digital sound data STL is 16, the communication interface 304 receives only the transmission signal STa of the first form transmitted through the transmission channel 400A. When the bit width (N) of the transmission digital sound data STL is 24, the communication interface 304 receives the transmission signal STa of the first form transmitted through the transmission channel 400A and the transmission signal STb of the second form transmitted through the transmission channel 400B.

In step ST13, the sound output apparatus 300 determines whether the bit width (N) of the transmission digital sound data STL is 16 or 24. When N is 16, the sound output apparatus 300 shifts to processing in step ST14. In step ST14, the sound output apparatus 300 processes, with the transmission-channel-A demodulating unit 305, the transmission signal STa of the first form received in step ST12 to obtain the first sound data (the LPCM higher-order bit stream STL-U).

In step ST14, the sound output apparatus 300 directly outputs the first sound data from the LPCM-sample combining unit 307 as the reception digital sound data STL' (the 16-bit LPCM sound data). Thereafter, in step ST15, the sound output apparatus 300 ends the processing.

When N is 24 in step ST13, the sound output apparatus 300 shifts to processing in step ST16. In step ST16, the sound output apparatus 300 processes, with the transmission-channel-A demodulating unit 305, the transmission signal STa of the first form received in step ST12 to obtain the first sound data (the LPCM higher-order bit stream STL-U). In step ST17, the sound output apparatus 300 processes, with the transmission-channel-B demodulating unit 306, the transmission signal STb of the second form received in step ST12 to obtain the second sound data (the LPCM lower-order bit stream STL-L').

In step ST18, the sound output apparatus 300 combines, with the LPCM-sample combining unit 307, the first sound data obtained in step ST16 and the second sound data obtained in step ST17. In this case, the LPCM-sample combining unit 307 combines the first sound data and the second sound data with the first sound data set as higher-order bits and the second sound data set as lower-order bits to obtain the reception digital sound data STL' (the 24-bit LPCM sound data). Thereafter, in step ST15, the sound output apparatus 300 ends the processing.

As explained above, in the sound transmission system 100 shown in FIG. 1, the sound data transmitting operation of the sound reproducing apparatus 200 is different depending on whether the transmission digital sound data STL is the 16-bit LPCM sound data or the bit-expanded 24-bit LPCM sound data. Specifically, when the transmission digital sound data STL is the 16-bit LPCM sound data, all the bits of the sound data are separated as the first sound data and transmitted to the sound output apparatus 300 through the transmission channel 400A as the transmission signal STa of the first form.

On the other hand, when the transmission digital sound data STL is the bit-expanded 24-bit LPCM sound data, the higher-order 16 bits of the sound data are separated as the first sound data and the remaining lower-order 8 bits are separated as the second sound data. The first sound data is transmitted to the sound output apparatus 300 through the transmission channel 400A as the transmission signal STa of the first form. The second sound data is transmitted to the sound output apparatus 300 through the transmission channel 400B as the transmission signal STb of the second form.

As explained above, when the transmission digital sound data STL is the bit-expanded 24-bit LPCM sound data and has a large data amount, data increased according to the bit expansion is transmitted to the sound output apparatus 300 through the transmission channel 400B. This makes it possible to satisfactorily transmit the transmission digital sound data without affecting the transmission of other data such as image data transmitted through the transmission channel 400A.

2. Second Embodiment

Overall Configuration Example of a Sound Transmission System

Figure 6:
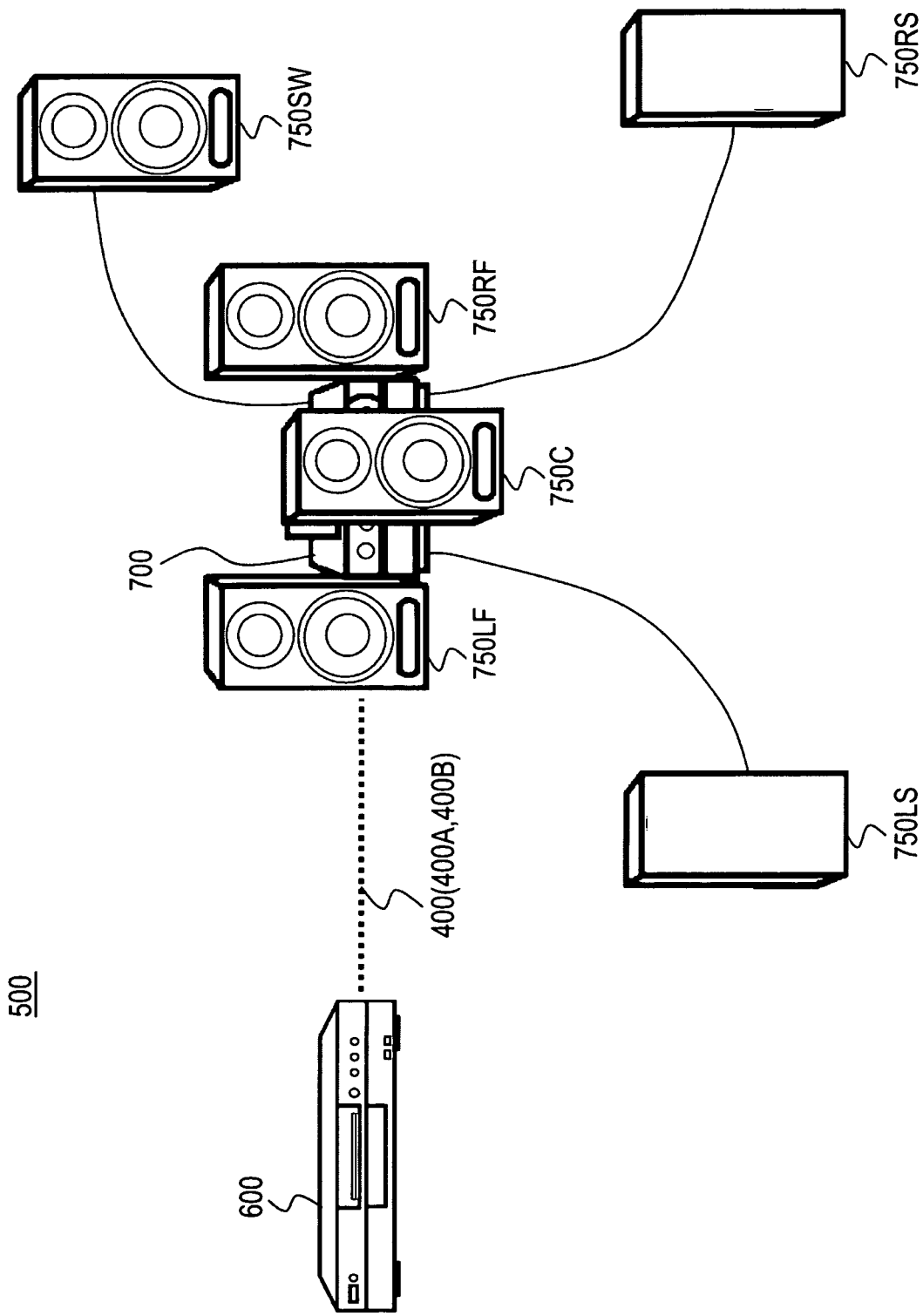
FIG. 6 is a block diagram of a configuration example of a sound transmission system according to a second embodiment of the present invention.

FIG. 6 is a diagram of the overall configuration of a sound transmission system 500 according to a second embodiment of the present invention. The sound transmission system 500 includes a sound reproducing apparatus 600 as a source apparatus, a sound output apparatus 700 as a sync apparatus, and a transmission channel 400.

The sound reproducing apparatus 600 reproduces digital sound data from a recording medium such as a nonvolatile memory, a magnetic disk, or an optical disk and transmits the digital sound data to the sound output apparatus 700 through the transmission channel 400. The sound reproducing apparatus 600 configures a sound-data transmitting apparatus.

Examples of the nonvolatile memory include an EEPROM (Electrically Erasable Programmable Read-Only Memory) and EPROM (Erasable Programmable ROM). Examples of the magnetic disk include a hard disk and a disc-like magnetic disk. Examples of the optical disk include a CD (Compact Disc), a DVD (Digital Versatile Disc), and a BD (Blu-Ray Disc (registered trademark)).

Speakers 750LF, 750C, 750RF, 750LS, 750RS, and 750SW of left (front), center, right (front), left (rear), right (rear), and LFE (Low Frequency Effect) channels are connected to the sound output apparatus 700. A 5.1-channel surround system includes the sound output apparatus 700 and the speakers. The sound output apparatus 700 receives the digital sound data transmitted from the sound reproducing apparatus 600 through the transmission channel 400 and drives the speakers to output sound on the basis of the digital sound data. The sound output apparatus 700 configures a sound data receiving apparatus.

Figure 7:
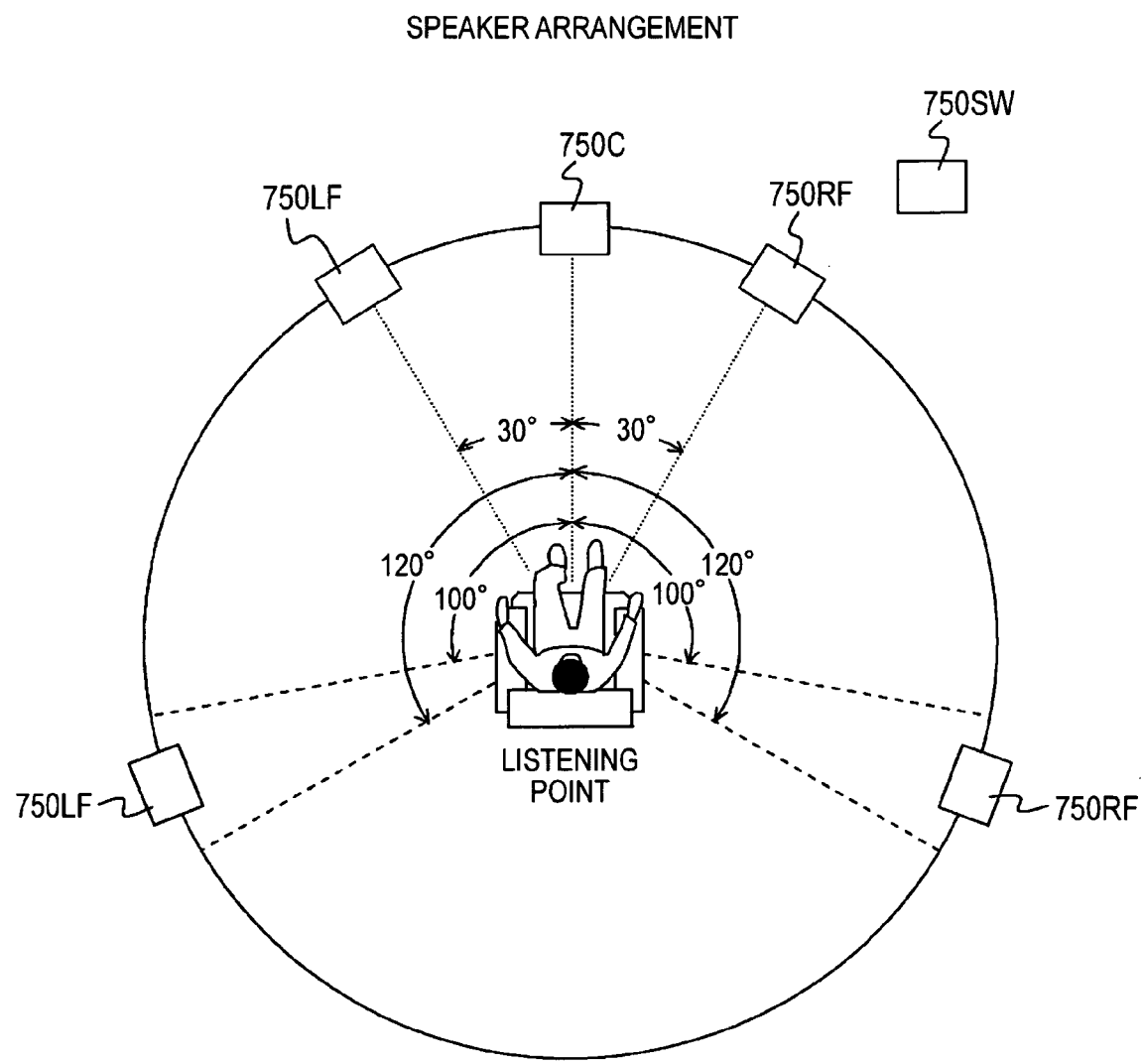
FIG. 7 is a diagram of a recommended arrangement example in the ITU (International Telecommunication Union) recommendation (ITU-R BS. 775-1)

FIG. 7 is a diagram of an arrangement example of the speakers. The arrangement example shown in FIG. 7 is a recommended arrangement example in the ITU (International Telecommunication Union) recommendation (ITU-R BS. 775-1). In the recommended arrangement example, the speakers 750LF, 750C, 750RF, 750LS, and 750RS are arranged at the equal distance from a listening point and on the same plane (at the same height) as the listening point. In the recommended arrangement example, an opening angle between the speaker 750LF and the speaker 750RF is set to 60° viewed from the listening point. In the recommended arrangement example, each of the speakers 750LS and 750RS is arranged at an opening angle of 100° to 120° viewed from the listening point with reference to the speaker 750C.

The transmission channel 400 is used to transmit digital sound data from the sound reproducing apparatus 600 to the sound output apparatus 700. The transmission channel 400 may be either wireless or wired. Although not explained in detail, the transmission channel 400 is the same as the transmission channel 400 in the sound transmission system 100 shown in FIG. 1 and includes the transmission channel 400A (the first transmission channel) and the transmission channel 400B (the second transmission channel).

As explained above, the sound transmission system 500 shown in FIG. 6 includes the transmission channels 400A and 400B. Therefore, in the sound reproducing apparatus 600, transmission digital sound data (a multi-channel sound signal) is separated into first sound data that should be transmitted through the transmission channel 400A and second sound data that should be transmitted through the transmission channel 400B. Specifically, in the sound reproducing apparatus 600, sound data of left (front), center, and right (front) channels for main sound are separated as first sound data and sound data of the remaining channels are separated as second sound data.

Therefore, when the sound data of the left (front), center, and right (front) channels are included in the transmission digital sound data, the sound data of the channels are separated as the first sound data and no sound data is separated as the second sound data. When the sound data of the left (rear), right (rear), and LFE channels as well as the left (front), center, and right (front) channels are included in the transmission digital sound data, the sound data of the left (front), center, and right (front) channels are separated as the first sound data and the remaining sound data of the left (rear), right (rear), and LFE channels are separated as the second sound data.

In the sound reproducing apparatus 600, for example, at least processing for adding data for error correction and digital modulation processing (e.g., QPSK or 16QAM) are applied to the separated first sound data and a transmission signal of a first form is obtained. In the sound reproducing apparatus 600, for example, at least, the separated second sound data is treated as straight binary data, which keeps a relation between an LSB and an MSB and simulatively subjected to analog modulation (AM, FM, etc.) and a transmission signal of a second form is obtained.

In the sound reproducing apparatus 600, the transmission signal of the first form is transmitted to the sound output apparatus 700 through the transmission channel 400A and the transmission signal of the second form is transmitted to the sound output apparatus 700 through the transmission channel 400B.

In the sound output apparatus 700, the transmission signal of the first form is received from the sound reproducing apparatus 600 through the transmission channel 400A and the transmission signal of the second form is received from the sound reproducing apparatus 600 through the transmission channel 400B.

In the sound output apparatus 700, the received transmission signal of the first form is processed and the first sound data is obtained. The received transmission signal of the second form is processed and the second sound data is obtained. In the sound output apparatus 700, the first sound data and the second sound data are combined with the first sound data set as the sound data of the left (front), center, and right (front) channels and the second sound data set as the sound data of the left (rear), right (rear), and LFE channels and reception digital sound data is obtained.

In this case, when only the sound data of the left (front), center, and right (front) channels are included in the transmission digital sound data in the sound reproducing apparatus 600, the transmission signal of the second form is not transmitted from the sound reproducing apparatus 600 through the transmission channel 400B. In this case, the first sound data is directly obtained as the reception digital sound data (the sound data of the left (front), center, and right (front) channels).

In this case, when the sound data of the left (rear), right (rear), and LFE channels as well as the left (front), center, and right (front) channels are included in the transmission digital sound data in the sound reproducing apparatus 600, the transmission signal of the second form is transmitted through the transmission channel 400B. In this case, the first sound data and the second sound dada are combined and the reception digital sound data (the sound data of the left (rear), right (rear), and LFE channels as well as the left (front), center, and right (front) channels) is obtained.

Before sound data is transmitted, channel information of the transmission digital sound data is supplied from the sound reproducing apparatus 600 to the sound output apparatus 700. This information is information for determining whether the transmission digital sound data includes only the sound data of the sound data of the left (front), center, and right (front) channels or further includes the sound data of the left (rear), right (rear), and LFE channels.

Consequently, the sound output apparatus 700 can recognize whether the transmission digital sound data includes only the sound data of the left (front), center, and right (front) channels or further includes the sound data of the left (rear), right (rear), and LFE channels. Therefore, the sound output apparatus 700 can determined whether reception processing for obtaining the second sound data should be performed or processing for combining the second sound data with the first sound data should be performed. This makes it possible to appropriately and efficiently obtain the reception digital sound data.

Figure 8:
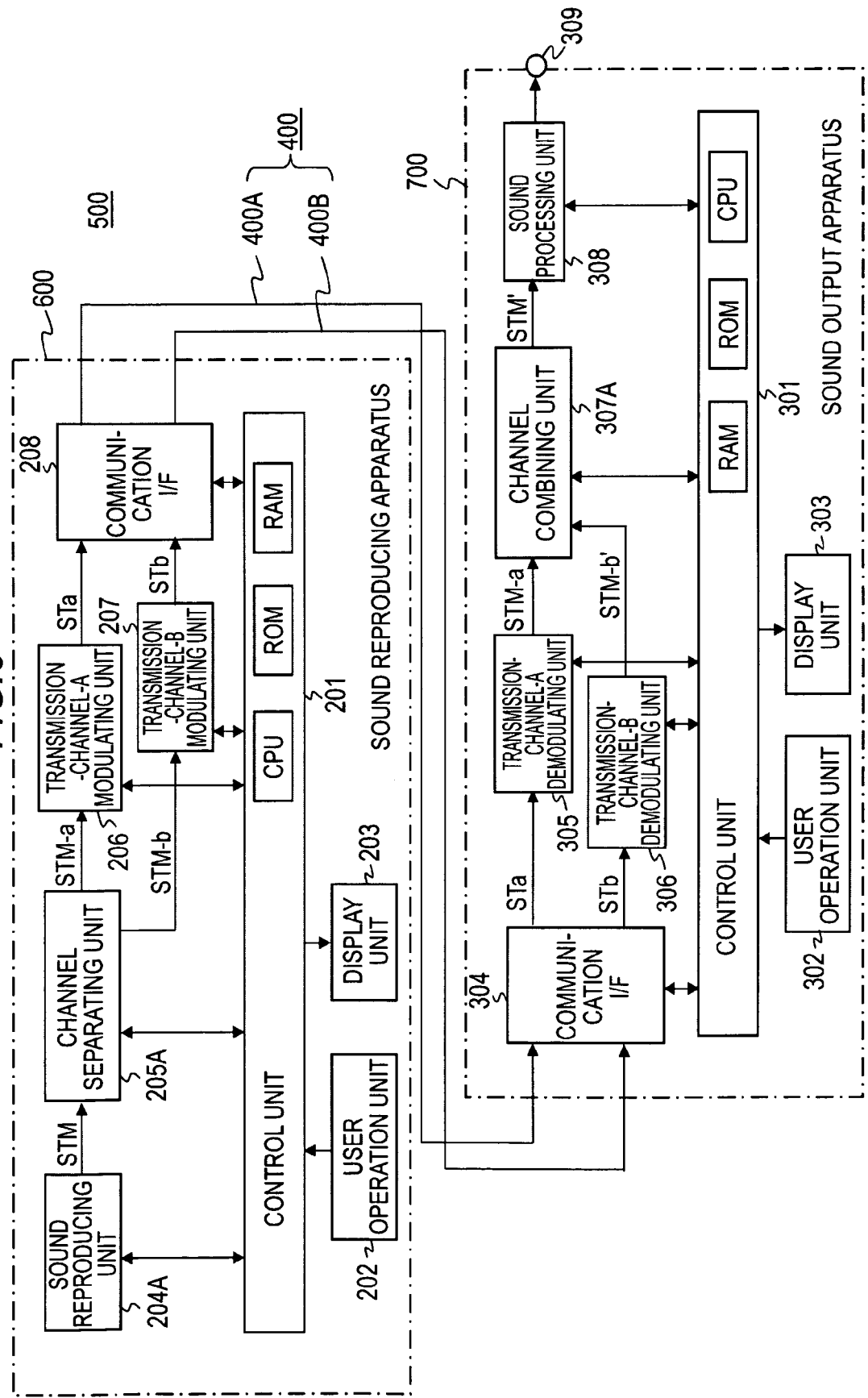
FIG. 8 is a block diagram of a configuration example of a sound reproducing apparatus and a sound output apparatus included in the sound transmission system.

Configuration Example of the Sound Reproducing Apparatus and the Sound Output Apparatus A specific configuration example of the sound reproducing apparatus 600 and the sound output apparatus 700 is explained below. FIG. 8 is a diagram of the configuration example of the sound reproducing apparatus 600 and the sound output apparatus 700. Components corresponding to those shown in FIG. 2 are denoted by the same reference numerals and signs and detailed explanation of the components is omitted as appropriate.

First, the sound reproducing apparatus 600 is explained. The sound reproducing apparatus 600 includes, as shown in FIG. 8, the control unit 201, the user operation unit 202, the display unit 203, a sound reproducing unit 204A, a channel separating unit 205A, the transmission-channel-A modulating unit 206, the transmission-channel-B modulating unit 207, and the communication interface 208. In the sound reproducing apparatus 600, the sound reproducing unit 204 and the LPCM-sample separating unit 205 of the sound reproducing apparatus 200 shown in FIG. 2 are replaced with the sound reproducing unit 204A and the channel separating unit 205A.

Although not shown in the figure, the sound reproducing unit 204A reproduces digital sound data of predetermined contents from a recording medium inserted therein such as a nonvolatile memory, a magnetic disk, or an optical disk and outputs a multi-cannel sound stream STM as the transmission digital sound data. In this embodiment, in some case, the multi-channel sound stream STM includes only the sound data of the left (front), center, and right (front) channels and, in another case, the multi-channel sound stream STM further includes the sound data of the left (rear), right (rear), and LFE channels.

The channel separating unit 205A separates the sound data of the left (front), center, and right (front) channels included in the multi-channel sound stream STM as the first sound data (a sound stream STM-a). The channel separating unit 205A separates the sound data of the left (rear), right (rear), and LFE channels included in the multi-channel sound stream STM as the second sound data (a sound stream STM-b).

When the multi-channel sound stream STM includes only the sound data of the left (front), center, and right (front) channels, the sound data of the channels are separated as the first sound data and no sound data is separated as the second sound data. However, when the multi-channel sound stream STM further includes the sound data of the left (rear), right (rear), and LFE channels, the sound data of the channels are separated as the second sound data. The channel separating unit 205A configures a data separating unit.

The transmission-channel-A modulating unit 206 processes the first sound data (the sound stream STM-a) obtained by the channel separating unit 205A to generate the transmission signal STa of the first form. In this case, for example, the transmission-channel-A modulating unit 206 at least applies processing for adding data for error correction and digital modulation processing to the first sound data to obtain the transmission signal STa of the first form.

The transmission-channel-B modulating unit 207 processes the second sound data (the sound stream STM-b) obtained by the channel separating unit 205A to generate the transmission signal STb of the second form. In this case, for example, the transmission-channel-B modulating unit 207 at least treats the second sound data as straight binary data, which keeps a relation between an LSB and an MSB, and simulatively applies analog modulation (AM, FM, etc.) to the second sound data to obtain the transmission signal STb of the second form.

Before transmitting the transmission signals STa and STb to the sound output apparatus 700, the communication interface 208 supplies, through the transmission channel 400, channel information of the multi-channel sound stream STM (the transmission digital sound data) output from the sound reproducing unit 204A. The communication interface 208 performs this operation under the control by the control unit 201.

Otherwise, the sound reproducing apparatus 600 is configured the same as the sound reproducing apparatus 200 shown in FIG. 2.

The sound output apparatus 700 is explained below. The sound output apparatus 700 includes, as shown in FIG. 8, the control unit 301, the user operation unit 302, the display unit 303, the communication interface 304, the transmission-channel-A demodulating unit 305, the transmission-channel-B demodulating unit 306, and a channel combining unit 307A. The sound output apparatus 700 further includes, as shown in FIG. 8, the sound processing unit 308 and the sound output terminal 309. In the sound output apparatus 700, the LPCM-sample combining unit 307 of the sound output apparatus 300 shown in FIG. 2 is replaced with the channel combining unit 307A.

Before receiving the transmission signals STa and STb from the sound reproducing apparatus 600, the communication interface 304 acquires, through the transmission channel 400, channel information of the multi-channel sound stream STM (the transmission digital sound data) in the sound reproducing apparatus 600.

The communication interface 304 supplies the channel information to the control unit 301. The control unit 301 recognizes, on the basis of this information, whether the transmission digital sound data, i.e., the reception digital sound data includes the sound data of the left (rear), right (rear), and LFE channels besides the sound data of the left (front), center, and right (front) channels and accurately performs operation control for the units.

The transmission-channel-A demodulating unit 305 processes the transmission signal STa of the first form received by the communication interface 304 to obtain the first sound data (the sound stream STM-a). The transmission-channel-B demodulating unit 306 processes the transmission signal STb of the second form received by the communication interface 304 to obtain the second sound data (a sound stream STM-b').

The channel combining unit 307A combines the first sound data obtained by the transmission-channel-A demodulating unit 305 and the second sound data obtained by the transmission-channel-B demodulating unit 306 with the first sound data set as the sound data of the front and center channels and with the second sound data set as the sound data of the rear and LFE channels. The channel combining unit 307A obtains reception digital sound data STM'.

When only the sound data of the left (front), center, and right (front) channels are included in the transmission digital sound data in the sound reproducing apparatus 600, the transmission signal of the second form is not transmitted from the sound reproducing apparatus 600 through the transmission channel 400B. In this case, the first sound data is directly obtained as the reception digital sound data STM' (the sound data of the left (front), center, and right (front) channels).

When the sound data of the left (rear), right (rear), and LFE channels as well as the left (front), center, and right (front) channels are included in the transmission digital sound data, the transmission signal of the second form is transmitted from the sound reproducing apparatus 600 through the transmission channel 400B. In this case, the first sound data and the second sound data are combined and the reception digital sound data STM' (the sound data of the left (rear), right (rear), and LFE channels as well as the left (front), center, and right (front) channels) is obtained. Otherwise, the sound output apparatus 700 is configured the same as the sound output apparatus 300 shown in FIG. 2.

Operation Example of the Sound Transmission System

The operation of the sound transmission system 500 shown in FIG. 6 is explained below. Before the start of transmission of the sound data from the sound reproducing apparatus 600 to the sound output apparatus 700, the sound reproducing apparatus 600 notifies the sound output apparatus 700 of channel information. The sound output apparatus 700 recognizes the information.

Figure 9:
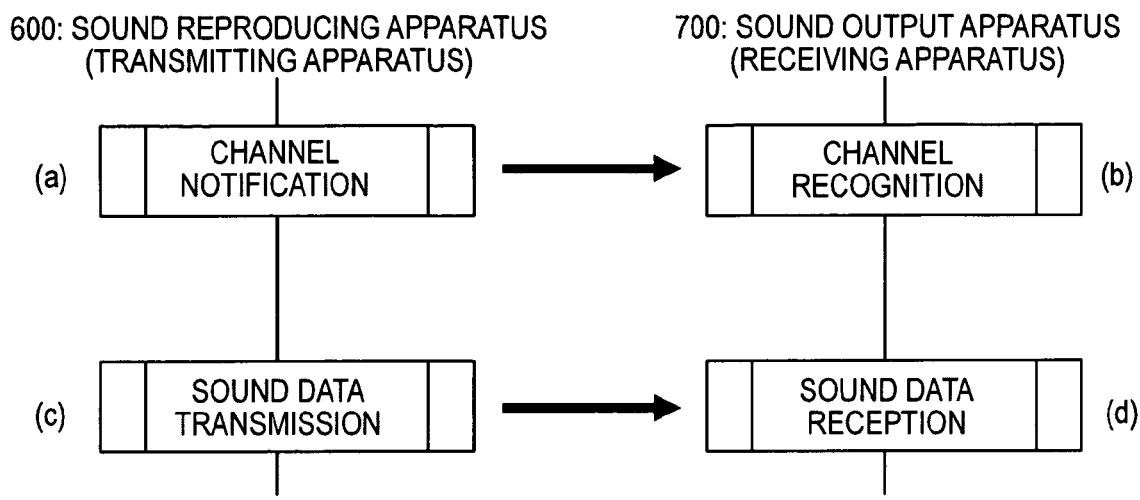
FIG. 9 is a sequence chart of a flow of operation of the sound reproducing apparatus and the sound output apparatus during the start of transmission of sound data.

FIG. 9 is a sequence chart of a flow of operation during the start of transmission of the sound data. (a) The sound reproducing apparatus 600 supplies the channel information of the transmission digital sound data to the sound output apparatus 700 and notifies the sound output apparatus 700 of the information. (b) The sound output apparatus 700 acquires the channel information of the transmission digital sound data from the sound reproducing apparatus 600 and recognizes the information. Specifically, the sound output apparatus 700 recognizes whether the transmission digital sound data, i.e., the reception digital sound data includes the sound data of the left (rear), right (rear), and LFE channels besides the left (front), center, and right (front) channels. Thereafter, (c) the sound reproducing apparatus 600 transmits sound data to the sound output apparatus 700. (d) The sound output apparatus 700 receives the sound data transmitted from the sound reproducing apparatus 600.

First, in the following explanation, the transmission digital sound data (the multi-channel sound stream STM) output from the sound reproducing unit 204A of the sound reproducing apparatus 600 includes only the sound data of the left (front), center, and right (front) channels. In this case, the channel separating unit 205A separates the sound data of the left (front), center, and right (front) channels as the first sound data and does not output the second sound data.

In this case, since the channel separating unit 205A does not output the second sound data, processing for obtaining the transmission signal STb of the second form in the transmission-channel-B modulating unit 207, processing for transmitting the transmission signal STb of the second form from the communication interface 208, and the like are not performed.

The channel separating unit 205A supplies the separated first sound data (the sound stream STM-a) to the transmission-channel-A modulating unit 206. The transmission-channel-A modulating unit 206 processes the first sound data to generate the transmission signal STa of the first form. The communication interface 208 transmits the transmission signal STa of the first form to the sound output apparatus 700 through the transmission channel 400A.

The communication interface 304 of the sound output apparatus 700 receives the transmission signal STa of the first form transmitted from the sound reproducing apparatus 600 through the transmission channel 400A. The sound output apparatus 700 recognizes in advance, according to the channel information notified from the sound reproducing apparatus 600, that the transmission digital sound data includes only the sound data of the left (front), center, and right (front) channels and the transmission signal STb of the second form is not transmitted. Therefore, processing for receiving the transmission signal STb of the second form in the communication interface 304, processing for obtaining the second sound data (the sound stream STM-b') in the transmission-channel-B demodulating unit 306, processing for combining data in the channel combining unit 307A, and the like are not performed.

The communication interface 304 supplies the received transmission signal STa of the first form to the transmission-channel-A demodulating unit 305. The transmission-channel-A demodulating unit 305 processes the transmission signal STa of the first form to obtain the first sound data (the sound stream STM-a). The channel combining unit 307A directly outputs the first sound data as the reception digital sound data STM' (the sound data of the left (front), center, and right (front) channels).

The channel combining unit 307A supplies the reception digital sound data STM' to the sound processing unit 308. The sound processing unit 308 applies the necessary processing such as amplification or D/A conversion to the reception digital sound data STM' and outputs sound signals of the channels after the processing to the sound output terminal 309. Consequently, reproduced sound by the sound data (the sound data of the left (front), center, and right (front) channels) is obtained from the speakers 750LF, 750C, and 750RF (not shown in FIG. 8, see FIG. 6) of the channels connected to the sound output terminal 309.

In the following explanation, the transmission digital sound data (the multi-channel sound stream STM) output from the sound reproducing unit 204A includes the sound data of the left (rear), right (rear), and LFE channels as well as the left (front), center, and right (front) channels. In this case, the channel separating unit 205A separates the sound data of the left (front), center, and right (front) channels as the first sound data. The channel separating unit 205A separates the sound data of the left (rear), right (rear), and LFE channels as the second sound data (the sound stream STM-b).

The channel separating unit 205A supplies the separated first sound data (sound stream STM-a) to the transmission-channel-A modulating unit 206. The transmission-channel-A modulating unit 206 processes to the first sound data to generate the transmission signal STa of the first form. The communication interface 208 transmits the transmission signal STa of the first form to the sound output apparatus 700 through the transmission channel 400A.

The channel separating unit 205A supplies the separated second sound data (sound stream STM-b) to the transmission-channel-B modulating unit 207. The transmission-channel-B modulating unit 207 processes the second sound data to generate the transmission signal STb of the second form. The communication interface 208 transmits the transmission signal STb of the second form to the sound output apparatus 700 through the transmission channel 400B.

The communication interface 304 of the sound output apparatus 700 receives the transmission signal STa of the first form transmitted from the sound reproducing apparatus 600 through the transmission channel 400A. The communication interface 304 receives the transmission signal STa of the second form transmitted from the sound reproducing apparatus 600 through the transmission channel 400B.

The communication interface 304 supplies the received transmission signal STa of the first form to the transmission-channel-A demodulating unit 305. The transmission-channel-A demodulating unit 305 processes the transmission signal STa of the first form to obtain the first sound data (the sound stream STM-a). The communication interface 304 supplies the received transmission signal STb of the second form to the transmission-channel-B demodulating unit 306. The transmission-channel-B demodulating unit 306 processes the transmission signal STb of the second form to obtain the second sound data (the sound stream STM-b').

The transmission-channel-A demodulating unit 305 supplies the obtained first sound data to the channel combining unit 307A. The transmission-channel-B demodulating unit 306 supplies the obtained second sound data to the channel combining unit 307A. The channel combining unit 307A combines the first sound data and the second sound data to obtain the reception digital sound data STM' (the sound data of the left (rear), right (rear), and LFE channels as well as the left (front), center, and right (front) channels).

The channel combining unit 307A supplies the reception digital sound data STM' to the sound processing unit 308. The sound processing unit 308 applies the necessary processing such as amplification and D/A conversion to the reception digital sound data STM' and outputs sound signals of the channels after the processing to the sound output terminal 309. Consequently, reproduced sound of the 5.1-channel surround system is obtained from the speakers 750LF, 750C, 750RF, 750LS, 750RS, and 750SW (not shown in FIG. 8, see FIG. 6) connected to the sound output terminal 309.

Figure 10:
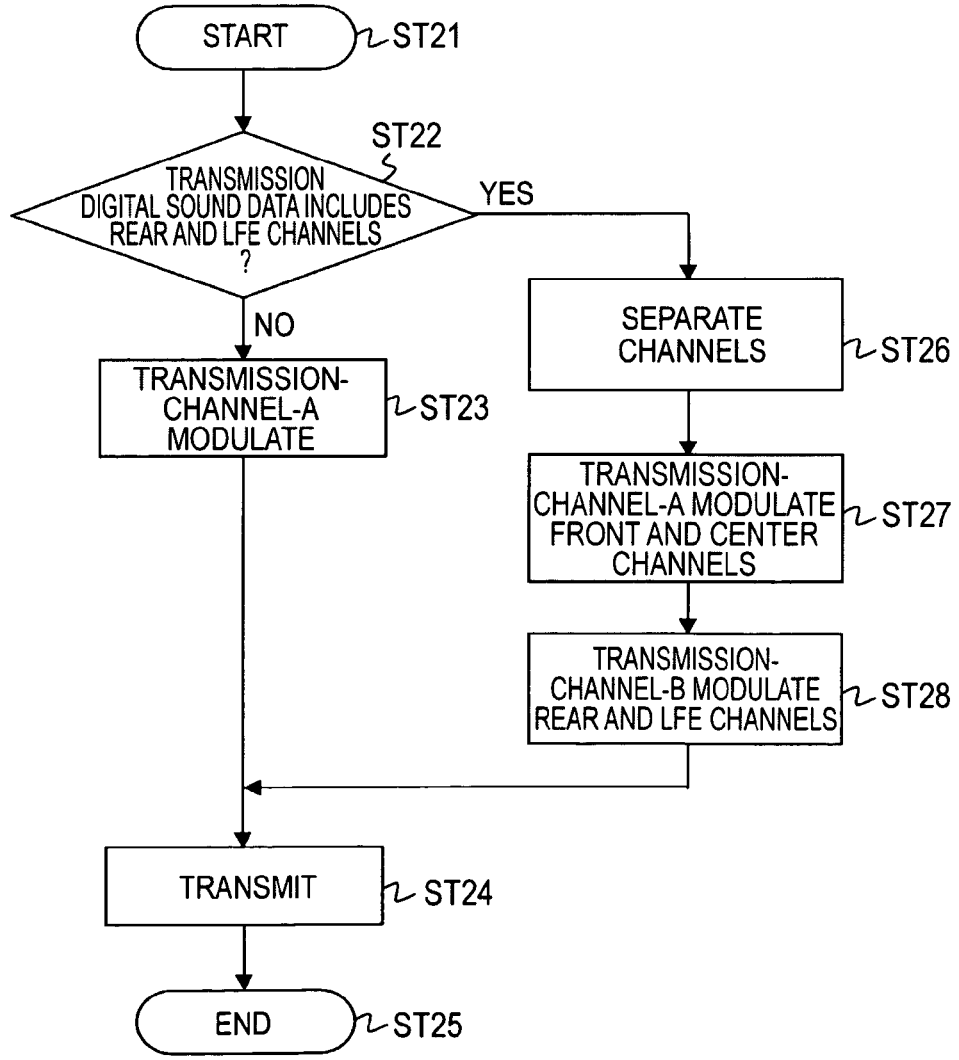
FIG. 10 is a flowchart for explaining a processing procedure of sound data transmitting operation in the sound reproducing apparatus.

A processing procedure of the sound data transmitting operation in the sound reproducing apparatus 600 is shown in a flowchart of FIG. 10. In the flowchart of FIG. 10, attention is paid to processing for one sample data of each channel. The same processing is repeatedly applied to respective sample data.

First, in step ST21, the sound reproducing apparatus 600 starts processing and then shifts to processing in step ST22. In step ST22, the sound reproducing apparatus 600 determines whether the transmission digital sound data STM includes the sound data of the rear and LFE channels besides the front and center channels.

When the transmission digital sound data does not include the left (rear), the right (rear) and LFE channels, the sound reproducing apparatus 600 shifts to processing in step ST23. In step ST23, the sound reproducing apparatus 600 separates, with the channel separating unit 205A, the sound data of the front and center channels from the sound data STM as the first sound data and generates, with the transmission-channel-A modulating unit 206, the transmission signal STa of the first form.

In step ST24, the sound reproducing apparatus 600 transmits, with the communication interface 208, the transmission signal STa of the first form obtained in step ST23 to the sound output apparatus 700 through the transmission channel 400A. Thereafter, in step ST25, the sound reproducing apparatus 600 ends the processing.

When the transmission digital sound data STM includes the sound data of the left (rear), right (rear), and LFE channels in step ST22, the sound reproducing apparatus 600 shifts to processing in step ST26. In step ST26, the sound reproducing apparatus 600 separates, with the channel separating unit 205A, the sound data of the front and center channels from the sound data STM as the first sound data. In step ST26, the sound reproducing apparatus 600 separates, with the channel separating unit 205A, the sound data of the rear and LFE channels from the sound data STM as the second sound data.

In step ST27, the sound reproducing apparatus 600 processes, with the transmission-channel-A modulating unit 206, the first sound data separated in step ST26 to obtain the transmission signal STa of the first form. In step ST28, the sound reproducing apparatus 600 processes, with the transmission-channel-B modulating unit 207, the second sound data separated in step ST26 to obtain the transmission signal STb of the second form.

In step ST24, the sound reproducing apparatus 600 transmits, with the communication interface 208, the transmission signal STa of the first form obtained in step ST27 to the sound output apparatus 700 through the transmission channel 400A. In step ST24, the sound reproducing apparatus 600 transmits, with the communication interface 208, the transmission signal STb of the second form obtained in step ST28 to the sound output apparatus 700 through the transmission channel 400B. Thereafter, in step ST25, the sound reproducing apparatus 600 ends the processing.

Figure 11:
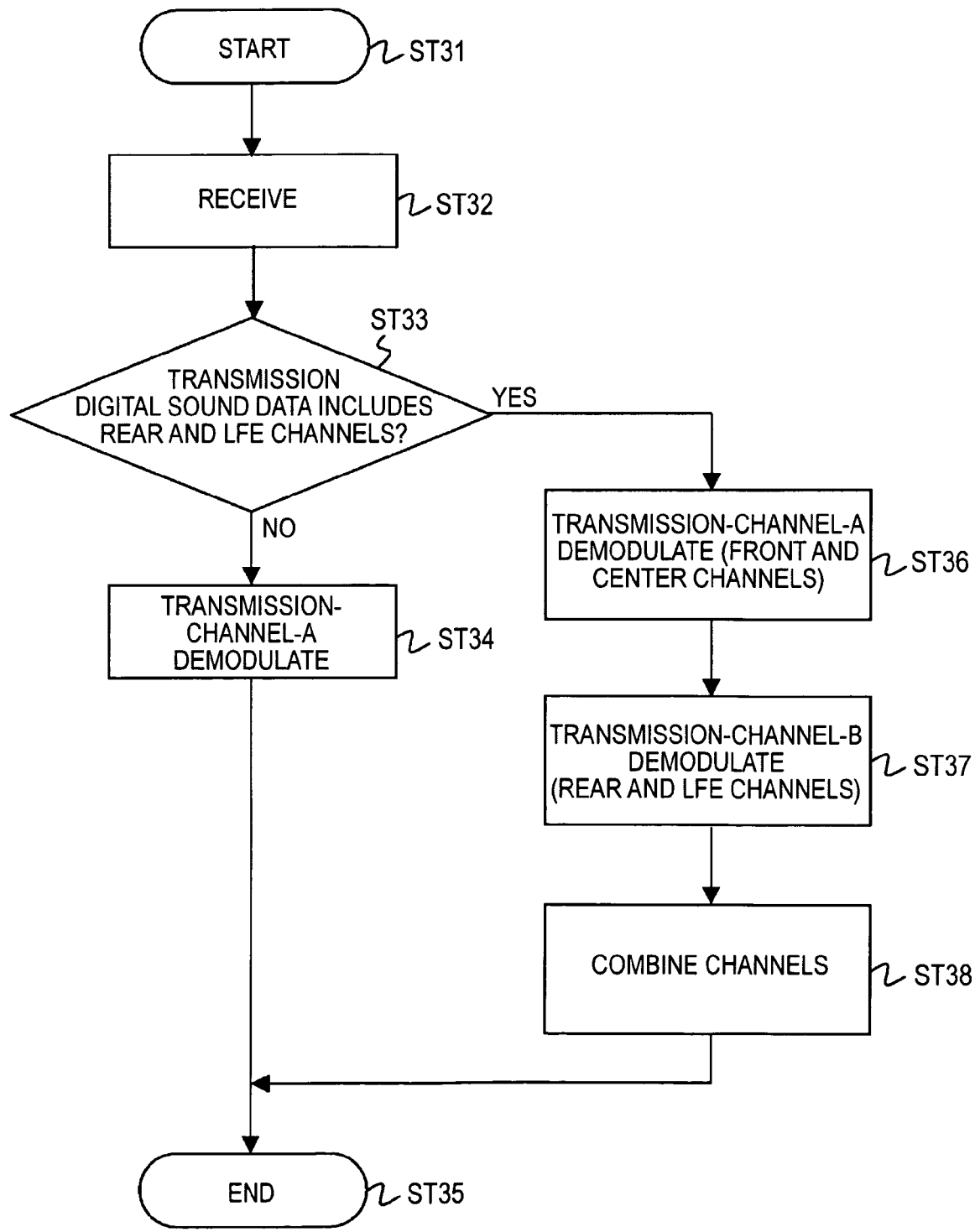
FIG. 11 is a flowchart for explaining a processing procedure of sound data receiving operation in the sound output apparatus.

A processing procedure of the sound data receiving operation in the sound output apparatus 700 is shown in a flowchart of FIG. 11. In the flowchart of FIG. 11, attention is paid to processing for one sample data of each channel. The same processing is repeatedly applied to respective sample data.

First, in step ST31, the sound output apparatus 700 starts processing and then shifts to processing in step ST32. In step ST32, the sound output apparatus 700 receives, with the communication interface 304, the transmission signals transmitted from the sound reproducing apparatus 600 through the transmission channel 400.

In this case, when the transmission digital sound data STM includes only the sound data of the front and center channels, the communication interface 304 receives only the transmission signal STa of the first form transmitted through the transmission channel 400A. When the transmission digital sound data STM further includes the sound data of the rear and LFE channels, the communication interface 304 receives the transmission signal STa of the first form transmitted through the transmission channel 400A and receives the transmission signal STb of the second form transmitted through the transmission channel 400B.

In step ST33, the sound output apparatus 700 determines whether the transmission digital sound data STM includes the sound data of the rear and LFE channels besides the front and center channels. When the transmission digital sound data STM includes only the sound data of the front and center channels, the sound output apparatus 700 shifts to processing in step ST34. In step ST34, the sound output apparatus 700 processes, with the transmission-channel-A demodulating unit 305, the transmission signal STa of the first form received in step ST32 to obtain the first sound data (the sound stream STM-a).

In step ST34, the sound output apparatus 700 directly outputs the first sound data from the channel combining unit 307A as the reception digital sound data STM' (the sound data of the front and center channels). Thereafter, in step ST35, the sound output apparatus 700 ends the processing.

When the transmission digital sound data STM includes the sound data of the rear and LFE channels besides the front and center channels in step ST33, the sound output apparatus 700 shifts to processing in step ST36. In step ST36, the sound output apparatus 700 processes, with the transmission-channel-A demodulating unit 305, the transmission signal STa of the first form received in step ST32 to obtain the first sound data (the sound stream STM-a). In step ST37, the sound output apparatus 700 processes, with the transmission-channel-B demodulating unit 306, the transmission signal STb of the second form received in step ST32 to obtain the second sound data (the sound stream STM-b').

In step ST38, the sound output apparatus 700 combines the first sound data obtained in step ST36 and the second sound data obtained in step ST37. In this case, the sound output apparatus 700 obtains the reception digital sound data STM' (the sound data of the front, center, rear, and LFE channels). Thereafter, in step ST35, the sound output apparatus 700 ends the processing.

As explained above, in the sound transmission system 500 shown in FIG. 6, the sound data transmitting operation of the sound reproducing apparatus 600 is different depending on whether the transmission digital sound data STM includes only the sound data of the front and center channels or further includes the sound data of the rear and LFE channels. Specifically, when the transmission digital sound data STM includes only the sound data of the front and center channels, the sound data of the front and center channels are separated as the first sound data. The first sound data is transmitted to the sound output apparatus 700 through the transmission channel 400A as the transmission signal STa of the first form.

On the other hand, when the transmission digital sound data STM further includes the sound data of the rear and LFE channels, the sound data of the front and center channels are separated as the first sound data and the sound data of the rear and LFE channels are separated as the second sound data. The first sound data is transmitted to the sound output apparatus 700 through the transmission channel 400A as the transmission signal STa of the first form. The second sound data is transmitted to the sound output apparatus 700 through the transmission channel 400B as the transmission signal STb of the second form.

As explained above, when the transmission digital sound data STM includes the sound data of the rear and LFE channels besides the front and center channels and has a large data amount, the sound data of the rear and LFE channels are transmitted to the sound output apparatus 700 through the transmission channel 400B. Therefore, it is possible to satisfactorily transmit the transmission digital sound data STM of the 5.1-channel surround system without affecting the transmission of the other data such as image data transmitted through the transmission channel 400A.

3. Modifications

In the first embodiment, the example in which the LPCM sound data is separated according to bit width is explained. However, it goes without saying that bit width for the separation and a method for the separation are not limited to the embodiment. Although not explained above, concerning a data increase due to an increase in a sampling frequency, it is also possible to realize the same effect by appropriately curtailing a data amount of the transmission channel 400A (the first transmission channel) using the transmission channel 400B (the second transmission channel).

In the first embodiment, the example concerning the multi-channel sound data is explained in which the 5.1 channel is separated into the front three channels and the other channels. However, it goes without saying that the number of channels and a method for the separation are not limited to the embodiment.

Although not explained above, it is also possible to realize loss-less decoding in the sound output unit by transmitting compressed data through the transmission channel 400A and transmitting differential data through the transmission channel 400B. It is also possible to realize, by transmitting a core section of sound data through the transmission channel 400A and transmitting an additional section of the sound data through the transmission channel 400B, higher-quality transmission of a compressed sound format without increasing a data transmission amount in the transmission channel 400A.

In the embodiments, the example in which the transmission digital sound data transmitted from the sound reproducing apparatuses 200 and 600 to the sound output apparatuses 300 and 700 is the LPCM sound data stream STL and the example in which the transmission digital sound data is the multi-channel sound stream STM are explained. However, in the present invention, it goes without saying that the transmission digital sound data is not limited to these streams.

In the embodiments, the example in which the sound data transmitting apparatus is the sound reproducing apparatuses 200 and 600 is explained and the example in which the sound data receiving apparatus is the sound output apparatuses 300 and 700 is explained. However, the sound data transmitting apparatus is not limited to the sound reproducing apparatus and may be, for example, broadcast receivers such as a set-top box and a television receiver and a personal computer connected to a network such as the Internet. The sound data receiving apparatus is not limited to the sound output apparatus and may be, for example, a sound recorder such as a disk recorder.

The present invention enables, even when a data amount of sound data increases, satisfactory transmission of the sound data without affecting transmission of other data such as image data and can be applied to a wireless or wired sound transmission system and the like.

It should be understood by those skilled in the art that various modifications, combinations, sub-combinations and alterations may occur depending on design requirements and other factors insofar as they are within the scope of the appended claims or the equivalents thereof.

What is claimed is:

1. A sound data transmitting apparatus that transmits digital sound data using a first transmission channel for transmitting a transmission signal of a first form guaranteed to obtain, as reception data, data same as transmission data and a second transmission channel for transmitting a transmission signal of a second form not guaranteed to obtain, as reception data, data same as transmission data, the sound data transmitting apparatus comprising:

- a processor coupled to, and configured to control
- a data separating unit that separates transmission digital sound data into first sound data that should be transmitted through the first transmission channel and second sound data that should be transmitted through the second transmission channel;
- a first transmission processing unit that processes the first sound data separated by the data separating unit to obtain the transmission signal of the first form;
- a second transmission processing unit that processes the second sound data separated by the data separating unit to obtain the transmission signal of the second form; and
- a data transmitting unit that transmits, through the first transmission channel, the transmission signal of the first form obtained by the first transmission processing unit and transmits, through the second transmission channel, the transmission signal of the second form obtained by the second transmission processing unit, in which the transmission digital sound data is multi-channel sound data stream which includes at least sound data for a left front channel, a center channel, and a right front channel, in which the data separating unit separates sound data for the left front channel, the center channel, and the right front channel as the first sound data and separates sound data for any remaining channels as the second sound data, in which the first data processing unit at least applies processing for adding data for error correction and digital modulation processing to the first sound data to obtain the transmission signal of the first form, and in which the second data processing unit at least treats the second sound data as straight binary data, which keeps a relation between an LSB and an MSB, and simulatively applies analog modulation to the second sound data to obtain the transmission signal of the second form.

* * * * *